(12) United States Patent
Farmer et al.

(10) Patent No.: US 11,358,014 B2
(45) Date of Patent: Jun. 14, 2022

(54) WEARABLE MASK FIT MONITOR

(71) Applicant: TSI, Incorporated, Shoreview, MN (US)

(72) Inventors: Nathaniel Rudolph Farmer, Lake Elmo, MN (US); Kenneth Rudolph Farmer, II, Lake Elmo, MN (US); Robert Caldow, Roseville, MN (US)

(73) Assignee: TSI, Incorporated, Shoreview, MN (US)

( * ) Notice: Subject to any disclaimer, the term of this patent is extended or adjusted under 35 U.S.C. 154(b) by 523 days.

(21) Appl. No.: 16/067,954

(22) PCT Filed: Jan. 6, 2017

(86) PCT No.: PCT/US2017/012507
§ 371 (c)(1),
(2) Date: Jul. 3, 2018

(87) PCT Pub. No.: WO2017/120452
PCT Pub. Date: Jul. 13, 2017

(65) Prior Publication Data
US 2020/0269076 A1    Aug. 27, 2020

Related U.S. Application Data

(60) Provisional application No. 62/276,579, filed on Jan. 8, 2016.

(51) Int. Cl.
*A62B 27/00*    (2006.01)
*A62B 9/00*    (2006.01)
(Continued)

(52) U.S. Cl.
CPC ............. *A62B 27/00* (2013.01); *A62B 9/006* (2013.01); *G01M 3/04* (2013.01); *G01M 3/20* (2013.01);
(Continued)

(58) Field of Classification Search
CPC ........ G01M 3/26; G01M 3/04; G01M 3/3236; G01M 3/3227; G01M 3/2876
(Continued)

(56) References Cited

U.S. PATENT DOCUMENTS 4,110,604 A * 8/1978 Haynes .............. G01N 15/1227
377/10
4,449,816 A * 5/1984 Kohsaka .............. G01N 15/065
356/336
(Continued)

FOREIGN PATENT DOCUMENTS

JP    2007212312    *    8/2007 ............. A61B 5/097
JP    2007212312 A    8/2007
(Continued)

OTHER PUBLICATIONS

International Search Report for International Application No. PCT/US2017/012507, dated Mar. 24, 2017 (3 pages).
(Continued)

*Primary Examiner* — Clayton E. LaBalle
*Assistant Examiner* — Kevin C Butler
(74) *Attorney, Agent, or Firm* — Kagan Binder, PLLC

(57) ABSTRACT

The respirator fit monitor described herein can be worn continuously by users so as to provide an indication as to how well their masks are fitting during use, thereby providing quantitative, wearable fit testers available for continuous use in real-life situations. The monitor includes a low-cost optical particle sensor assembly and controller unit for performing mask fit tests by comparing particle concentrations inside and outside of the mask. The fit test monitor is low cost and wearable, capable of dual sampling, capable of fit factor ratios well above 100, is battery powered and provides near real time measurements with a means for indicating the fit of the mask. The system includes wired or
(Continued)

wireless communications for data logging, analysis and display capabilities.

32 Claims, 25 Drawing Sheets

(51) Int. Cl.

| | | |
|---|---|---|
| *G01M 3/20* | (2006.01) | |
| *G01M 3/38* | (2006.01) | |
| *G01M 3/28* | (2006.01) | |
| *G01M 3/04* | (2006.01) | |
| *G01M 3/32* | (2006.01) | |
| *G01M 3/26* | (2006.01) | |

(52) U.S. Cl.
CPC ............ *G01M 3/26* (2013.01); *G01M 3/2876* (2013.01); *G01M 3/3227* (2013.01); *G01M 3/3236* (2013.01); *G01M 3/38* (2013.01)

(58) Field of Classification Search
USPC .............................................................. 73/40
See application file for complete search history.

(56) References Cited

U.S. PATENT DOCUMENTS

| | | | | | |
|---|---|---|---|---|---|
| 4,790,650 | A * | 12/1988 | Keady | ............... | G01N 15/065 |
| | | | | | 356/337 |
| 4,846,166 | A * | 7/1989 | Willeke | ............... | A62B 27/00 |
| | | | | | 128/200.24 |
| 4,950,073 | A * | 8/1990 | Sommer | ............... | B82Y 15/00 |
| | | | | | 356/37 |
| 5,026,155 | A * | 6/1991 | Ockovic | ............... | G01N 15/065 |
| | | | | | 356/37 |
| 5,118,959 | A * | 6/1992 | Caldow | ............... | G01N 15/065 |
| | | | | | 250/573 |
| 5,255,555 | A * | 10/1993 | McKeique | ............ | G01N 15/06 |
| | | | | | 73/28.01 |
| 5,903,338 | A * | 5/1999 | Mavliev | ............... | G01N 15/065 |
| | | | | | 356/338 |
| 6,125,845 | A | 10/2000 | Halvorsen et al. | | |
| 6,469,780 | B1 * | 10/2002 | McDermott | ......... | G01N 15/065 |
| | | | | | 356/335 |
| 6,639,671 | B1 * | 10/2003 | Liu | .................... | G01N 15/0205 |
| | | | | | 356/336 |
| 6,778,912 | B2 * | 8/2004 | Wyatt | ................... | G01N 1/2202 |
| | | | | | 356/337 |
| 7,064,834 | B2 * | 6/2006 | Johnson | ............... | G01N 1/2202 |
| | | | | | 356/336 |
| 7,173,257 | B1 * | 2/2007 | Warrick | ............. | G01N 15/0255 |
| | | | | | 250/458.1 |
| 7,213,476 | B2 * | 5/2007 | Cheng | ................ | G01N 15/0266 |
| | | | | | 73/865.5 |
| 7,437,908 | B2 * | 10/2008 | Bae | .................... | G01N 15/0656 |
| | | | | | 324/71.4 |
| 7,471,076 | B2 * | 12/2008 | Ahn | .................... | G01N 15/0266 |
| | | | | | 324/71.4 |
| 7,536,898 | B2 * | 5/2009 | Owen | ....................... | G01N 1/38 |
| | | | | | 73/28.04 |
| 7,587,929 | B2 * | 9/2009 | Zielinski | ................ | A62B 27/00 |
| | | | | | 73/46 |
| 7,594,426 | B1 * | 9/2009 | Gruenfelder | ........ | G01M 3/2876 |
| | | | | | 73/40 |
| 7,605,910 | B2 * | 10/2009 | Ahn | .................... | G01N 15/0266 |
| | | | | | 250/335 |
| 7,966,862 | B2 * | 6/2011 | Gualtieri | ............ | G01N 15/0656 |
| | | | | | 73/28.01 |
| 8,072,598 | B2 * | 12/2011 | Ahn | ...................... | G01N 15/065 |
| | | | | | 356/337 |
| 8,312,761 | B1 * | 11/2012 | Montividas | ............ | A62B 27/00 |
| | | | | | 73/40 |
| D680,011 | S * | 4/2013 | Chen | .............................. | D10/97 |
| 8,708,708 | B1 | 4/2014 | Carideo et al. | | |
| 9,157,871 | B2 * | 10/2015 | Hong | ..................... | G01N 1/2205 |
| 9,170,180 | B2 * | 10/2015 | Shinohara | ................ | G01N 1/40 |
| 9,322,684 | B2 * | 4/2016 | Pike | .......................... | G01F 1/34 |
| 9,625,365 | B2 * | 4/2017 | Ho | ........................ | B01F 5/0609 |
| 10,502,710 | B2 * | 12/2019 | Hochgreb | ................. | B03C 3/49 |
| 2006/0048783 | A1 * | 3/2006 | Liu | ......................... | A62B 27/00 |
| | | | | | 128/206.19 |
| 2009/0209877 | A1 * | 8/2009 | Zhang | ................... | B05B 7/0012 |
| | | | | | 600/529 |
| 2009/0267242 | A1 * | 10/2009 | Nichols | ................ | A61M 11/007 |
| | | | | | 261/4 |
| 2009/0323062 | A1 * | 12/2009 | Ariyoshi | ............ | G01N 15/1459 |
| | | | | | 356/337 |
| 2012/0286958 | A1 * | 11/2012 | Dunbar | ................... | B23K 9/322 |
| | | | | | 340/603 |
| 2016/0067531 | A1 | 3/2016 | Pariseau et al. | | |
| 2018/0117271 | A1 * | 5/2018 | Wigforss | ............... | A61B 5/087 |

FOREIGN PATENT DOCUMENTS

| | | |
|---|---|---|
| JP | 2014515988 A | 7/2014 |
| WO | 2012/153184 A1 | 11/2012 |

OTHER PUBLICATIONS

Written Opinion for International Application No. PCT/US2017/012507, dated Mar. 24, 2017 (5 pages).
Japanese Patent Application No. 2018-535318, Translated Notice of Reasons for Refusal, dated Oct. 19, 2020, 7 pgs.
Japanese Patent Application No. 2018-535318, Translated Search Report, dated Sep. 28, 2020, 12 pgs.

* cited by examiner

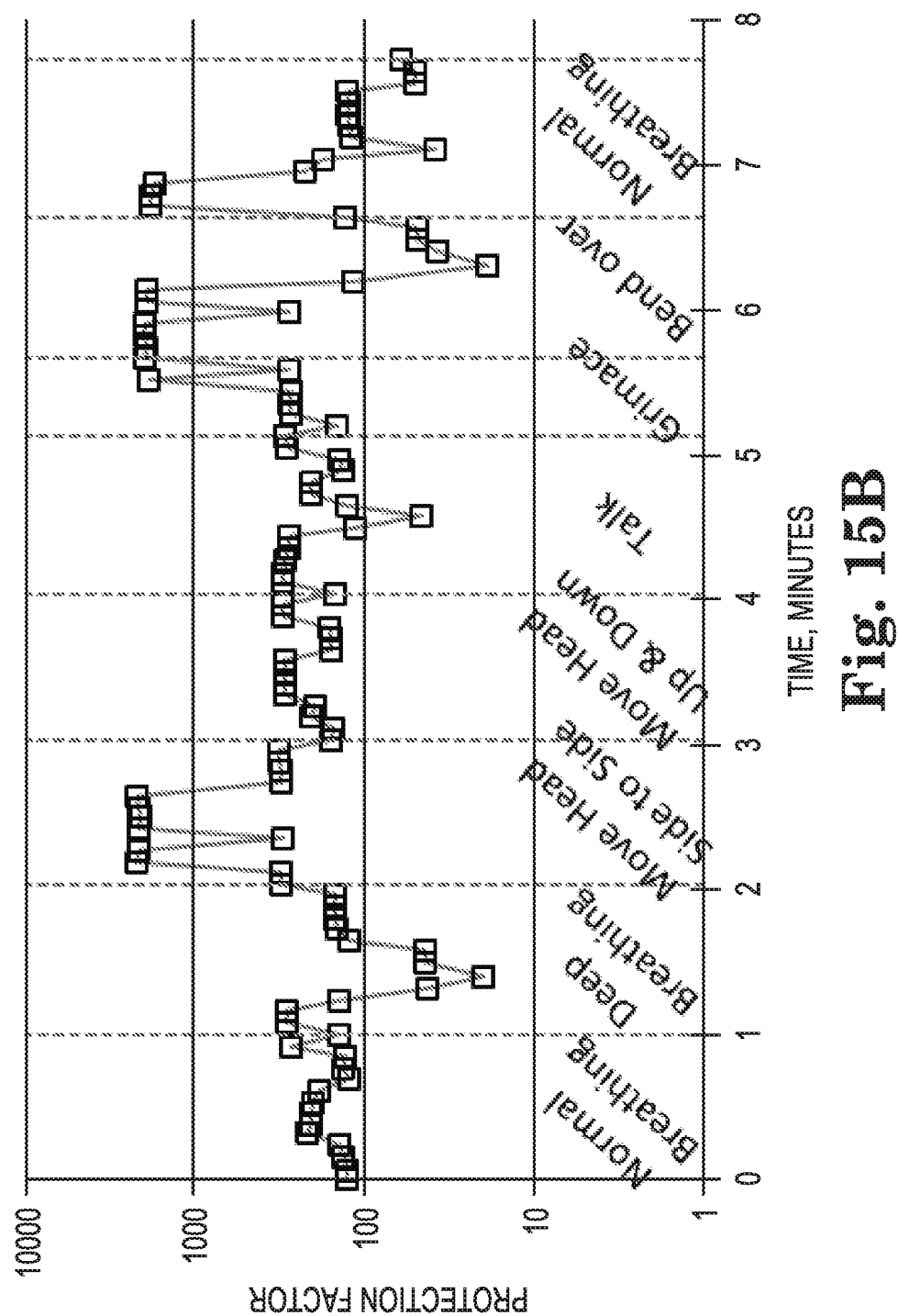

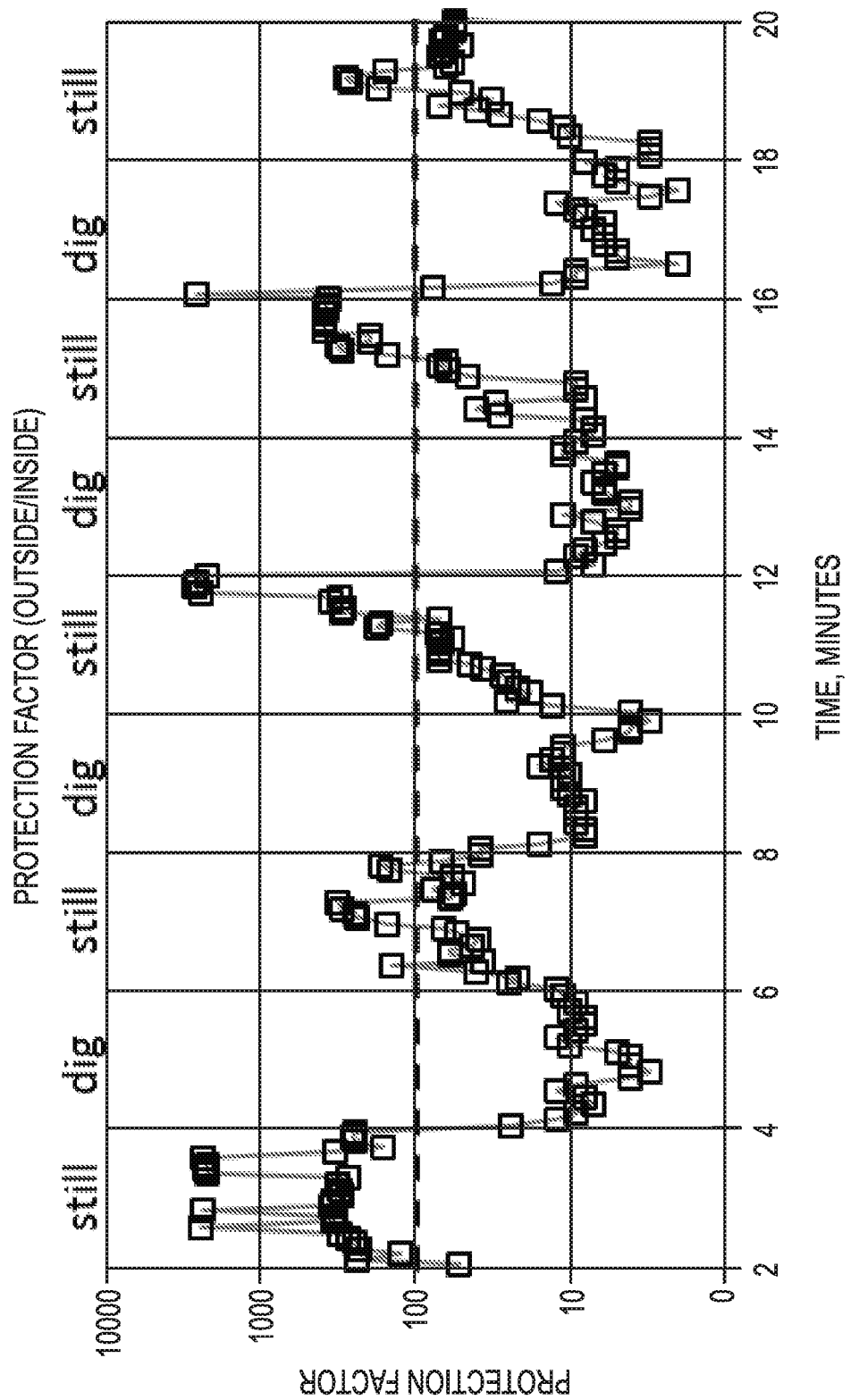

WEARABLE MASK FIT MONITOR

CLAIM OF PRIORITY

This application claims priority to and the benefit of International Application No. PCT/US2017/012507 filed on Jan. 6, 2017, which claims priority to and the benefit of U.S. Provisional Patent Application No. 62/276,579, filed Jan. 8, 2016 and titled "WEARABLE MASK FIT MONITOR", all of which are incorporated herein by reference in their entireties.

FIELD AND BACKGROUND OF THE INVENTION

The present invention relates to test equipment for protective gas masks and respirators.

OSHA estimates that 5 million workers must wear respirators at 1.3 million job locations throughout the US each work day to protect themselves from the hazards of their environment. While there is a regulation that requires these workers to undergo fit testing annually to show that they can properly don a mask, there is no quantitative way for them to know how well their mask is fitting while they are using it.

Respirators protect wearers from inhaling harmful dusts, fumes, vapors or gas, ranging from cheap disposable masks to half-face and full-face reusable models. Most respirators function by forming a tight seal on the user's face with the respirator itself, hence respirators must fit well or else they can leak. There cannot be gaps between the edges of the mask and the wearer's face. There are two types of measurements to test the effectiveness of this fit, qualitative and quantitative. Qualitative tests involve spraying an aerosol outside the mask and having the user smell or taste it inside the mask. Quantitative tests focus on a "fit factor" which is based on the ratio of tiny particles inside and outside the mask. Minimum required fit factors range from 100 for classic "N95" disposable masks to 500 or more for full-face respirators. Qualitative testing is less expensive but quantitative is more accurate. While there is expensive and bulky equipment available to perform these tests on an annual basis as required by US regulations, it does not appear that there are any quantitative, wearable fit testers available for continuous use in real-life situations.

Two primary methods in use today in fit testing are "photometric aerosol measurement" and "condensation particle counting (CPC)." The photometric method involves using a photometer to detect the aerosol inside and outside the respirator. Typically a constant concentration of aerosol is maintained outside the respirator, but recently a commercial fit tester has been introduced that measures just the natural ambient aerosol outside the mask, without the use of an enclosure. A photometer uses light scattering from a flowing stream of particles to measure the number concentration of particles as a function of their size. Particle mass can be estimated from this measurement based on assumptions about the particle geometry and density. Since this is an optical technique it measures particles with diameters equal to or greater than visible light wavelengths, ~0.3 microns and above.

On the other hand, the condensation particle counting method counts particles with diameters that are 10 to 100 times smaller than what the photometer measures, e.g., ~0.03 microns and above. In normal environments, the smaller particles are much more plentiful than the larger ones. In the CPC, the small particles in a flowing stream are first grown to a larger size by vapor condensation and then detected either by photometric light scattering or by single particle optical counting. Although different particle sizes are used in the two measurements and fit testing techniques, in both cases the particles are small enough that they can penetrate mask leaks. Tests with both methods show that they are reasonably equivalent, especially for fit factors below 1000. It should be noted that the fit factor is not just a ratio of particles outside to inside a mask, but rather it is a composite of ratios measured during a series of 15 second to 1 minute long facial exercises.

In industrial and occupational hygiene applications there are requirements that workers undergo mask fit testing periodically and to regularly use a protective mask while working. However, mask compliance by the worker and continuous and effective protection of the worker using the mask is not easily measured today without the use of expensive equipment or personnel intensive review of mask compliance. Therefore, there is a need for a quantitative solution for worker protection and for management in mask use compliance that is low cost, easy to implement and can be accessed remotely.

SUMMARY

The various embodiments described herein are based on the concept of easily generating a protection factor (PF) for a protective mask user. The protection factor is a ratio of particle concentration being measured outside the mask to that which is measured inside. Hence, PF=(particle concentration outside the mask)/(particle concentration inside the mask). The optimal goal is to achieve a PF ratio above a predetermined threshold while in a hazardous environment. The purpose of the PF is to mitigate leakage and to ensure accurate measurement of particle density. Hence, in various embodiments described herein the respirator/mask, the optical sensor being used, an auxiliary pump and a sealable housing will assist in arriving at a sound PF. Having the ability to measure protection factors greater than 100 (N95 protection capability), with up to at least 1000 is preferable in order to provide a wide range or margin in the "good" range of mask fit performance. This would indicate a tight mask fit, capable of reducing harmful particles to be leaked into the mask. Various embodiments described herein provide the protection factor real time to the user in a lightweight form factor, that can be used with an N95 type mask, is capable of transmitting data via WiFi or other wireless means (ultimately to a PC or smartphone) or collecting data either by built-in memory and providing the user a visual (such as an LED), tactile (e.g., haptic vibrator) and/or audible indicator (e.g., beeper) or alert of an environmental hazard or a mask protection system that is failing or not sufficiently protective. In a related embodiment, a display is included on the wearable unit that shows a real-time fit factor or a light that indicates the effectiveness of fit such as green-yellow-red for good-marginal-bad, or a remote display on a receiving device such as a cellphone.

In one example embodiment, there is provided a mask or respirator fit monitor that can be worn continuously by the user and a method of miniaturizing the mask fit test monitoring device using an optimal particle detection technique to fit in this proposed form factor. In this example embodiment, optical detection is used along with two optical particle counters to perform a fit test by comparing particle concentrations inside and outside a mask. In a related embodiment, one optical particle counter is used with a switching valve to receive two aerosol samples (inside and outside the mask) and generate two signals corresponding to the two aerosol samples. Optical detection (photometric or particle counting) offers the benefits of low-cost, miniature particle sensors that can be low-power and light weight and are much cheaper than a CPC. The monitor described herein can count particles as well as distinguish between different sizes and estimate mass, providing a range of prospective measurements to use for sensing. In particular, the monitor is wearable, provides dual sampling, is capable of achieving fit factor ratios well above 100, is battery powered, and provides a means for indicating the fit of the mask. The system includes a smart device or smartphone display and data logging of the data received from the monitor. By adding data logging or data communication, employers can be sure that workers are using their masks properly (or at all) for increased safety.

In another example embodiment, a wearable respirator fit test monitor is provided that includes a first and a second optical particle sensor adapted to measure particle concentration in an aerosol sample, the first optical sensor having an inlet for receiving a first aerosol sample and the second optical sensor having an inlet for receiving a second aerosol sample. The monitor further includes a controller unit adapted to receive a first and second input signals corresponding to particle concentrations in each of the first and second aerosol samples received from each of the first and second optical sensors, wherein the controller unit generates a particle concentration parameter corresponding to a ratio of the first and second input signals received from the first and second optical sensors. A power source is also included for powering the controller unit and the optical particle sensors. In a related embodiment, the wearable respirator fit test monitor further includes an auxiliary pump coupled to an exhaust of the first and second optical sensors to facilitate a continuous airflow through the sensors. The controller unit of the wearable monitor, in this example embodiment, generates a protection factor parameter corresponding to a quantitative effectiveness of a mask fitting a user and is configured to operate with a user warning device that is responsive to the controller unit and a protection factor parameter exceeding a predefined level such that the user warning device initiates a signal to the user that the protection factor parameter has been exceeded. In these embodiments, the user warning device is selected from the group consisting of an LED, a vibrational speaker or transducer and an audio indicator. In these embodiments, the controller unit further comprises a communications device for wirelessly transmitting particle collection data to at least one of a display device and an external communications network or via a wire or cable to a wired network or device.

In a related example embodiment, a wearable respirator fit test monitoring system is provided that includes the wearable monitor described above and a wearable mask for a user configured to provide the first aerosol sample to an inlet of the first optical sensor. The system also includes a device for collecting and directing the second aerosol sample to the second optical sensor and a smart device operatively coupled to the controller unit, the smart device configured to display data to the user and for data logging and storage of data, wherein the controller unit generates a fit factor parameter corresponding to a quantitative effectiveness of the mask fitting the user.

In yet another example embodiment, a wearable respirator fit test monitor is provided with an optical particle sensor adapted to measure particle concentration in an aerosol sample, the optical sensor having an inlet for receiving an aerosol sample. The monitor also includes a controller unit adapted to receive a first and second input signals corresponding to particle concentrations in each of a first and second aerosol samples received from each of the optical particle sensor, wherein the controller unit generates a particle concentration parameter corresponding to a ratio of the first and second input signals received from the optical sensor. The monitor further includes a switching valve device coupled to the optical sensor and adapted to facilitate sampling a first aerosol sample and a second aerosol sample using the optical particle sensor, wherein the controller unit actuates the switching valve to generate the first and second input signals from the optical sensor; and a power source for powering the controller unit and the optical particle sensor. In a related embodiment, the wearable respirator fit test monitor further includes an auxiliary pump coupled to an exhaust of the optical sensor to facilitate a continuous airflow through the sensor. In this example embodiment, the controller unit generates a protection factor parameter corresponding to a quantitative effectiveness of a mask fitting a user.

In a related embodiment, the wearable respirator fit monitor as described above includes a controller unit having a communications device for wirelessly transmitting particle collection data to at least one of a display device and an external communications network. A wearable respirator fit test monitoring system is also provided that includes the test monitor described above and a wearable mask for a user configured to provide the first aerosol sample to an inlet of the optical sensor. The system further includes a smart device operatively coupled to the controller unit, the smart device configured to display data to the user and for data logging and storage of data, wherein the controller unit generates a fit factor parameter corresponding to a quantitative effectiveness of the mask fitting the user.

DESCRIPTION OF THE DRAWINGS

The embodiments of the present invention may be more completely understood in consideration of the following detailed description of various embodiments in connection with the accompanying drawings, in which:

FIGS. 15A and 15B illustrate how the protection monitor system is used in a real time OSHA mask fit example to generate particle readings inside and outside a mask and to generate a protection factor, respectively.

FIGS. 18A, 18B and 18C illustrate how the protection monitor system is used in a simulated military exercise example to generate particle readings inside a protective mask, outside a protective mask, and to generate a protection factor signaling mask protection to a soldier during various points in performing the exercise, respectively.

Figure 1:
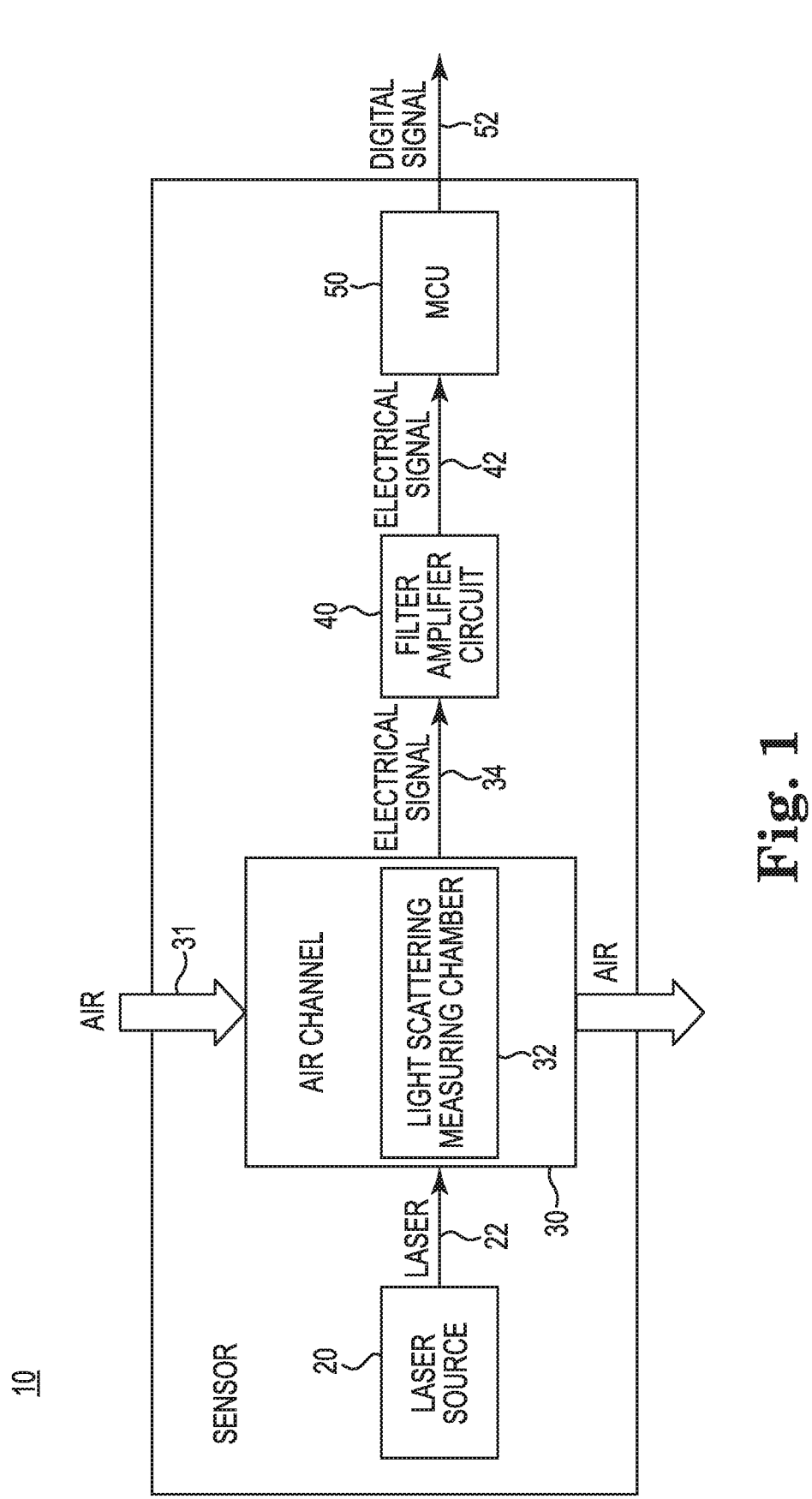
FIG. 1 illustrates a general operating principle of a low cost optical sensor and its associated components.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION OF THE INVENTION

Following are more detailed descriptions of various related concepts related to, and embodiments of, methods and apparatus according to the present disclosure. It should be appreciated that various aspects of the subject matter introduced above and discussed in greater detail below may be implemented in any of numerous ways, as the subject matter is not limited to any particular manner of implementation. Examples of specific implementations and applications are provided primarily for illustrative purposes.

In various example embodiments described herein there is utilized at least two optical particle sensors to measure the indoor (or inside a mask) and outdoor (or outside the mask) particle concentrations simultaneously, which can then be wirelessly communicated and displayed on a graphical user dashboard. The wireless capability allows a protection factor for the protection of a user to be continuously monitored without the hindrance of a cable connection. In a related example embodiment, a single optical particle sensor is used with a switching valve to allow for switching from inside a mask to outside the mask to collect particle concentration data for calculation of the protection factor. In yet another example embodiment, the connection from a wearable protection monitor can be a hard wire cable from the monitor to a laptop or to a smartphone for analysis and display of the data.

In yet another example embodiment, a wearable protection monitor includes an auxiliary pump to increase the flow rate and even out the airflow through the particle sensor or multiple sensors. The inclusion of the pump also ensures that the flow is not "back-streamed" and contaminants are not drawn from the environment back into the user's mask. Generally, each of the protection monitoring systems described herein includes a dynamic system, a data processing system and a user interface. Together these elements are capable of effectively sampling air from the breathing zone of the user, calculating the concentrations of particles and displaying results to the operator or user in a web-based dashboard or other displays.

Referring now to the figures, in FIG. 1 there is illustrated a general operating principle of a low cost optical (laser) sensor 10 and its associated components that is one of the main components of a wearable protection monitor as taught herein. These types of sensors use a serial data output which will be easier to use than pulse width modulation (PWM) or analog output of other sensors, include an active fan driven measurement which has a faster response and is more stable than a passive device. In addition, the laser-based sensor is more sensitive and provides both particle counts and mass to give more measurement options to choose from. In these example embodiments, G1 and G5 optical sensor devices are manufactured by Plantower (China). Low-cost particle sensor 10 includes a laser source 20 that emits a laser beam 22 through an air channel 30 which allows air 31 to pass through a light scattering measuring chamber 32. An electrical signal 34 is emitted from channel 30 that is an indication of the particles passing through channel 30 and passes through a filter amplifier circuit 40, which in turn generates an electrical signal 42. Signal 42 passes through an MCU 50 (microcontroller) before exiting as a digital signal 52. The Table 1 below provides examples of optical sensors available for use in the embodiments described herein:

| Sensor name | Source | Footprint | Airflow driver | Principle of operation | Data output and sensitivity/range |
| --- | --- | --- | --- | --- | --- |
| SEN0177 or Plantower PMS1003 or G1 | DF Robot.com or Taobao.com | 65 × 42 × 23 mm | Active fan | IR laser and photo-detector | Serial digital output. Provides 16 bit values for PM1.0, PM2.5, PM10, and particle counts >0.3, 0.5, 1.0, 2.5, 5.0 and 10 µm. Range 0-600 µg/m$^3$ or 0-65535 counts per 0.1 liters of air updated every ~1 second. |

| Sensor name | Source | Footprint | Airflow driver | Principle of operation | Data output and sensitivity/range |
|---|---|---|---|---|---|
| Plantower PMS3003 or G3 | Alibaba.com or Taobao.com | 65 × 42 × 23 mm | Active fan | IR laser and photo-detector | Serial digital output. Provides 16 bit values for PM1.0, PM2.5 and PM10. Range 0-600 $\mu g/m^3$. |
| Plantower PMS5003 or G5 | Taobao.com | 50 × 38 × 21 mm | Active fan | IR laser and photo-detector | Serial digital output. Provides 16 bit values for PM1.0, PM2.5, PM10, and particle counts >0.3, 0.5, 1.0, 2.5, 5.0 and 10 μm. Range 0-600 $\mu g/m^3$ or 0-65535 counts per 0.1 liters of air updated every ~1 second. |

Figure 2:
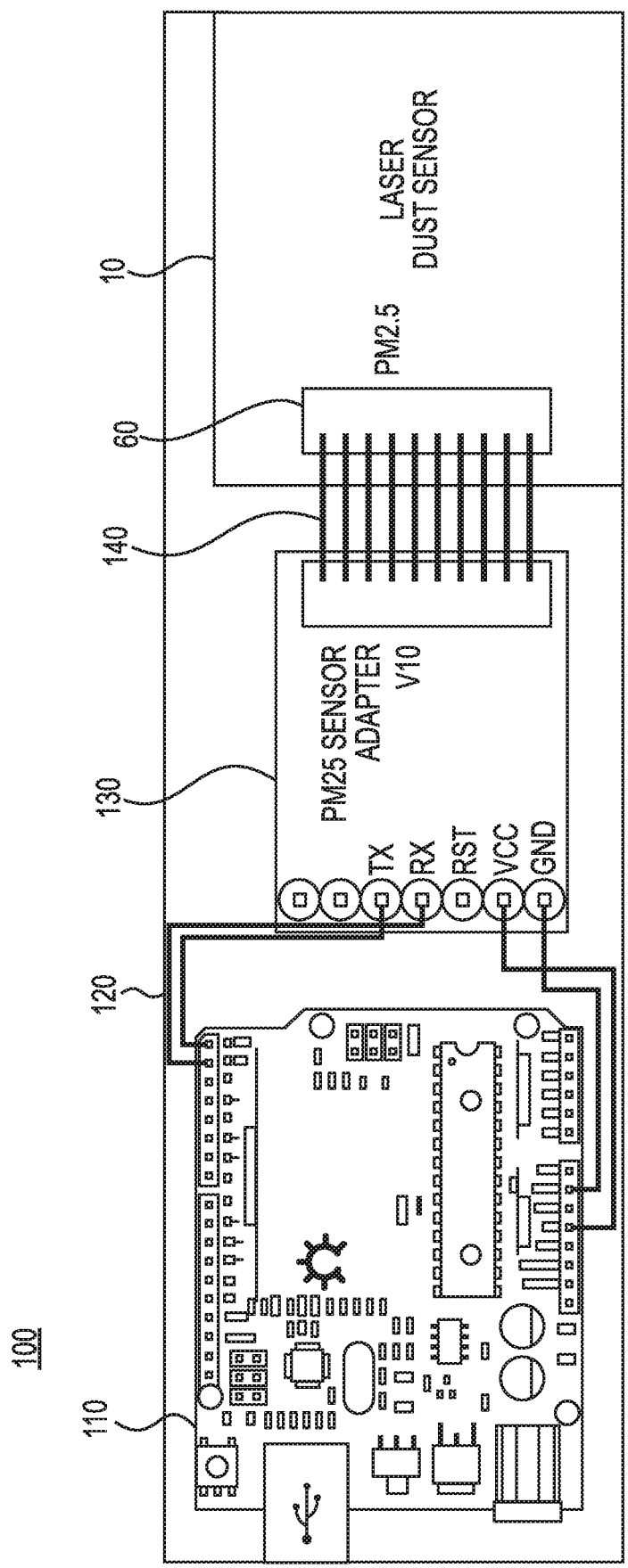
FIG. 2 illustrates an optical sensor connected to an Arduino device.

Referring now to FIG. 2, an Arduino/optical sensor assembly 100 is illustrated that includes an optical sensor 10 that is electrically coupled from an output 60 and a cable or serial connector 140 to an Arduino unit 110 for reading and controlling sensor 10 or more than one sensor. Sensor assembly 100 includes a set of connections 120 via a sensor adapter 130 to couple with optical sensor 10. Sensor 10 is powered by 5V from Arduino board 110 and the serial output transmitted by the sensor (Tx) is read by the Arduino's serial receiver (Rx). The sensor outputs a 32 byte data stream roughly every second. The initial Arduino sketch for communicating with the G1 and G5 sensors is provided in Appendix 1, which is incorporated herein by reference in its entirety. When a data packet is ready, the Arduino reads in 32 bytes, prints out each of the bytes to the PC's serial monitor and also prints out the converted concentration and count values determined by multiplying each high byte by 256 and adding the corresponding low byte. Appendix 2 (which is incorporated herein by reference in its entirety) shows the sketch built on this code to read two sensors simultaneously and print the resulting data to the serial monitor of a PC.

TABLE 2

Communication protocol for G1 and G5 sensors.
Serial port baudrate: 9600, Parity: None, Stop
bits: 1, Packet Length: fixed at 32 bytes

| Byte | Contents (hex) |
|---|---|
| 1 | 42 |
| 2 | 4D |
| 3, 4 | high byte and low byte, Frame Length = 2 * 12 + 2(data + checksum) = 001C |
| 5, 6 | HB & LB, PM1.0 $\mu g/m^3$ |
| 7, 8 | HB & LB, PM2.5 $\mu g/m^3$ |
| 9, 10 | HB & LB, PM10 $\mu g/m^3$ |
| 11, 12 | HB & LB, scaled PM1.0 $\mu g/m^3$ |
| 13, 14 | HB & LB, scaled PM2.5 $\mu g/m^3$ |
| 15, 16 | HB & LB, scaled PM1.0 $\mu g/m^3$ |
| 17, 18 | HB & LB, # particles dia > 0.3 μm in 0.1 l air |
| 19, 20 | HB & LB, # particles dia > 0.5 μm in 0.1 l air |
| 21, 22 | HB & LB, # particles dia > 1.0 μm in 0.1 l air |
| 23, 24 | HB & LB, # particles dia > 2.5 μm in 0.1 l air |
| 25, 26 | HB & LB, # particles dia > 5.0 μm in 0.1 l air |
| 27, 28 | HB & LB, # particles dia > 10 μm in 0.1 l air |
| 29, 38 | HB & LB, internal test data |
| 31, 32 | Checksum = sum of bytes 1 to 30 |

Figure 3:
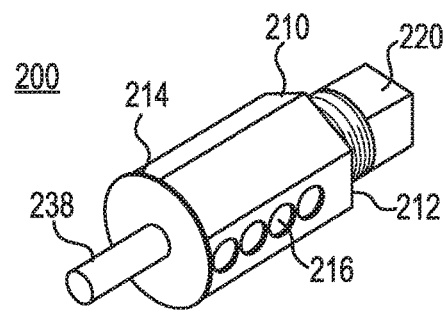
FIG. 3 illustrates a sensor adapter to facilitate coupling of an optical sensor to a tube assembly.

Referring now to FIG. 3, there is illustrated a sensor hose adapter 200 to facilitate coupling of an optical sensor to a tube assembly which will eventually be connected to a mask for inside mask particle collection or for outside particle data collection. Sensor adapter 200 includes a hose adapter that is designed using a brass pipe threaded coupler 210 with a plug 220 on one end 212, a hose receiver 230 attached to other end 214 with a set of holes 216 formed or drilled into coupler 210 to align with a set of inlet holes in the optical sensor.

Figure 4A:
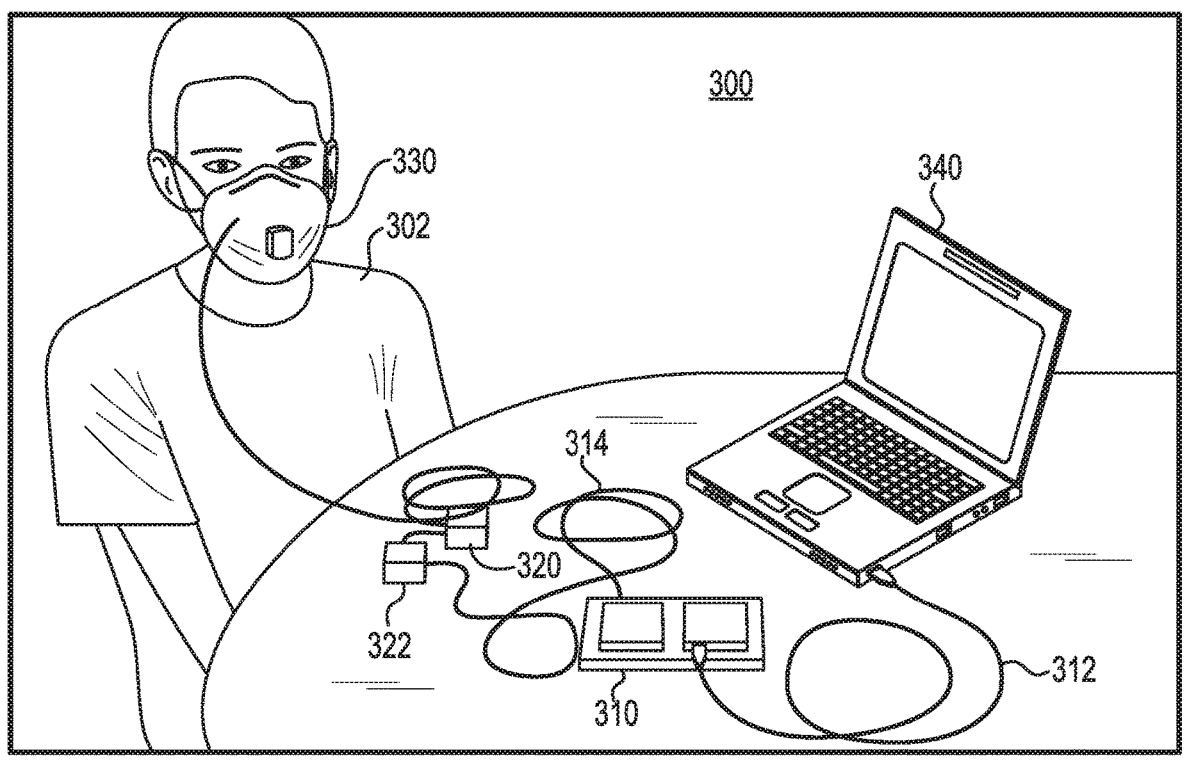
FIGS. 4A and 4B illustrate a real-life mask fit test system displaying results on a laptop computer and a smartphone, respectively.
Figure 4B:
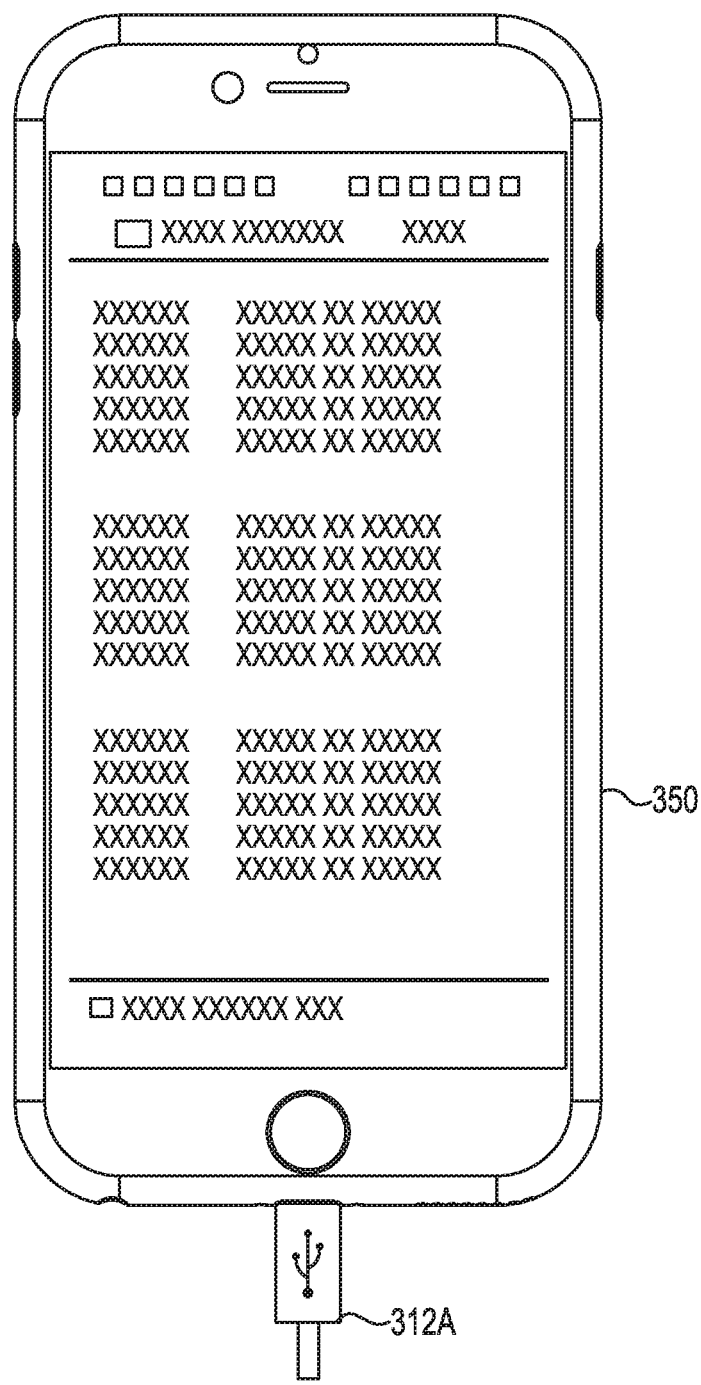

FIGS. 4A and 4B illustrate a real-life mask fit test system 300 on a user 302 displaying results on a laptop computer 340 and a smartphone 350, respectively. In particular, system 300 includes a controller board 310 including an Arduino unit that has a data output 312 to laptop 340 or output 312A to smartphone 350. Optical sensors 320 and 322 are coupled on one end via cable 314 to controller board 310. Optical sensor 320 is coupled to an N95 mask 330 fitted with a hose receiver and a pair of hoses run from the two sensors to the mask, with one hose sensing particles inside the mask and the other sensing particles near the mask, sensing the outside environment. Approximately real-time protection factors are regularly generated by system 300 for user 302 and displayed on either the laptop or the smartphone by taking the ratio of outside particle levels to inside the mask particle levels.

Figure 5A:
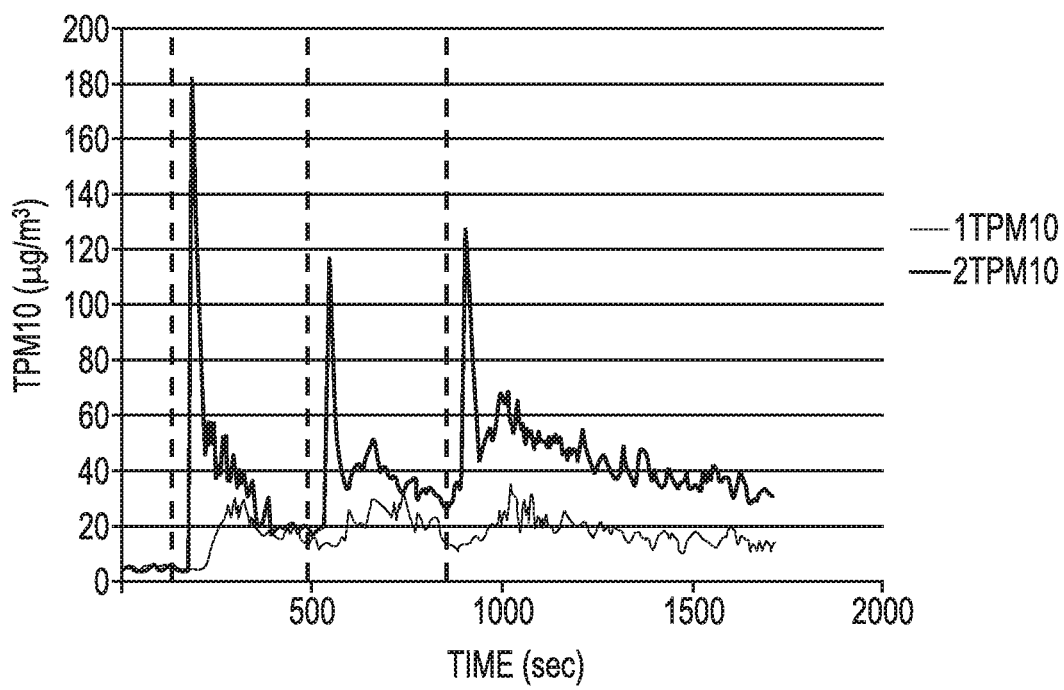
FIGS. 5A and 5B illustrate a two sensor test of the system illustrated in FIG. 4 and the fit factor test results in response to match strikes, respectively.
Figure 5B:
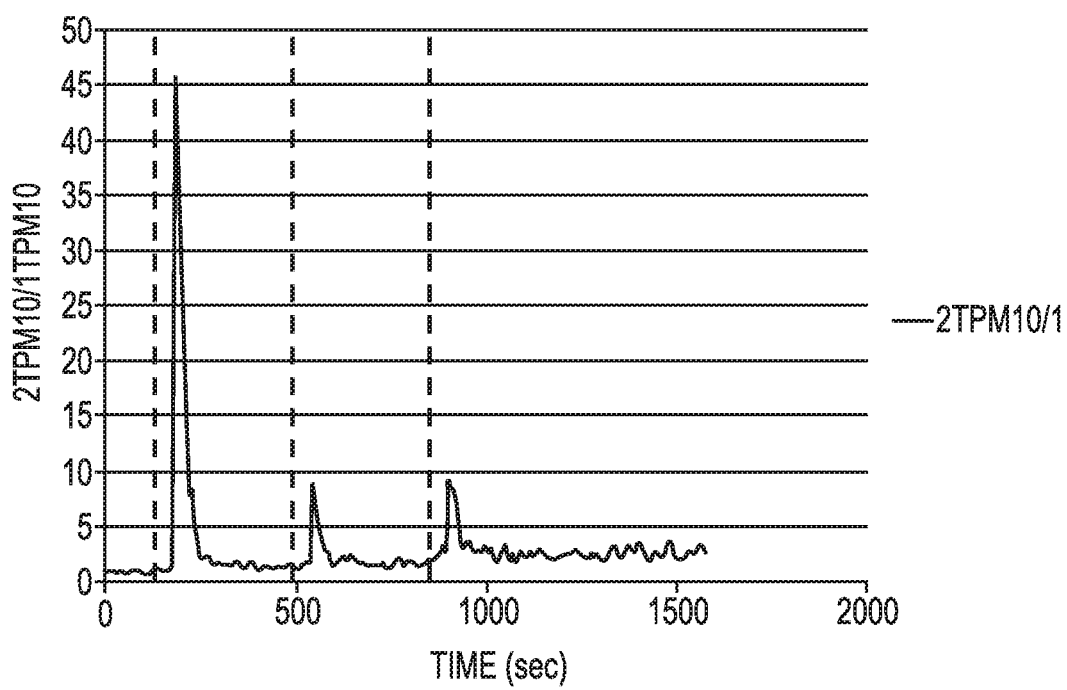

Referring now to FIG. 5 and the set-up of FIG. 4A, the user 302 puts on mask 330 with the attached hoses. Match strikes occur at t=130, 490 and 850 seconds while the user sits fairly motionless acquiring data. The experiment is repeated several times as shown in FIG. 5A. In this example, there is consistently about a 45 second delay between when each match is struck and particles are detected by the sensor outside the mask. Optical sensor 320 for inside the mask also responds to the match strike, but after a much longer delay of 89 to 112 seconds. This fit factor ratio for the first match strike is about 45 indicating a fairly good fit, but it is much lower for the second and third match strikes because the background level measured by the sensor inside the mask is gradually increasing.

Figure 6:
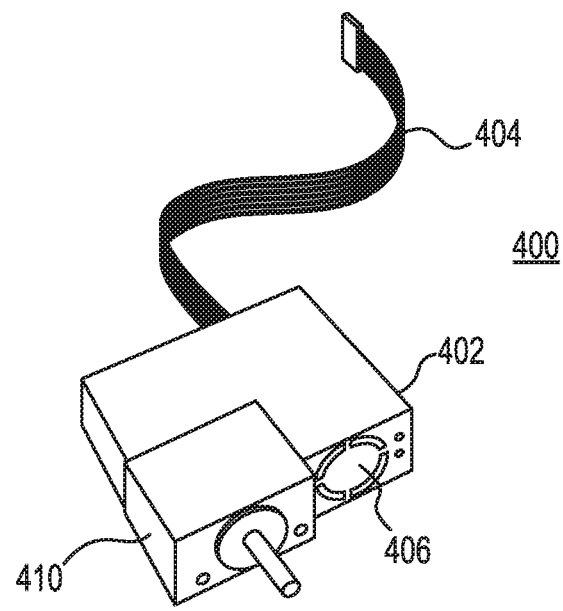
FIG. 6 illustrates an optical sensor with a sensor adapter assembly according to the teachings herein.

FIG. 6 illustrates an optical sensor assembly 400 with an optical sensor 402 and a sensor adapter assembly 410. Sensor assembly 400 includes a cable connector 404 for connecting sensor 402 to a controller board. Sensor adapter 410 provides a more direct flow path of particles into optical sensor 402 and accommodates space for an optical sensor exhaust 406.

Figure 7:
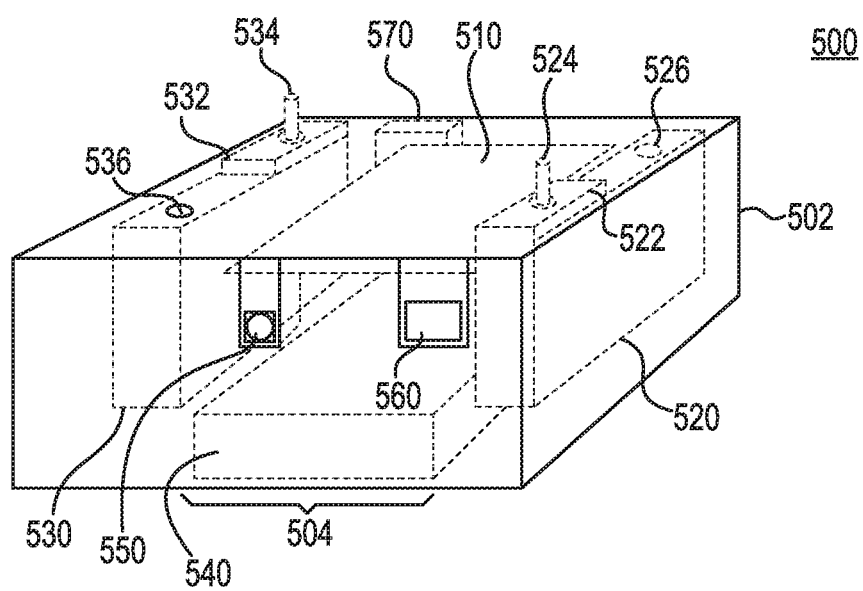
FIG. 7 illustrates a block diagram of an example embodiment of a wearable mask fit sensor assembly according to the teachings herein.

FIG. 7 illustrates a block diagram of an example embodiment of a wearable mask fit sensor assembly 500 according to the teachings herein. The components for the wearable protection monitor unit 500 include two optical sensors 520 and 530 with adapters 522 and 532, respectively, attached thereto and housed within a housing 502 having a belt clip

504 (optional). In one example embodiment, housing 502 is an enclosure made by BUD Industries (#AN-1304). Assembly 500 further includes a controller board 510 in the form of an Arduino board (Medog UNO R3 Board through Amazon) that supports a power connection 550 and a serial connector 560 and is coupled to an on/off switch 570 (a rotary switch (Cooper #459Q-PTA). Assembly 500 further includes a power source 540 comprised of a 5-AA battery holder (Parallax #753-00007). To facilitate connection to hoses going to a mask and to the outside environment, optical sensors 520 and 530 include sensor adapters 522 and 532, respectively, with receiving hoses or inlets 524 and 534, respectively. In addition, the sensors include exhausts 526 and 536, respectively, to exhaust out the particle airflows from the mask and the outside environment. In this example embodiment, given a maximum current draw for each optical sensor of 120 mA and a 50 mA draw for the Arduino board, the minimum battery life can be expected to exceed 8 hours, given a typical AA battery capacity of 2500 mA-h.

Figure 8A:
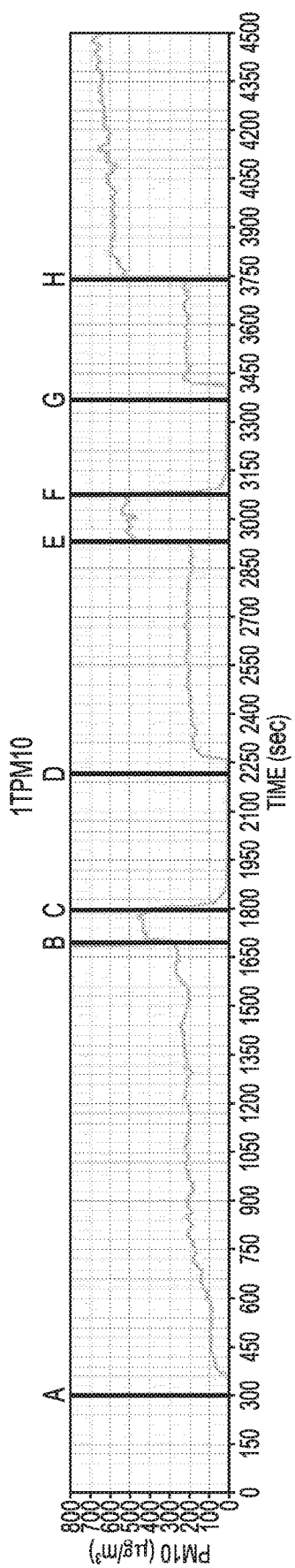
FIGS. 8A, 8B and 8C illustrate test results of the wearable mask fit sensor assembly of FIG. 7 on an N95-type mask with a breathing port, a traditional N-95 mask and a standard dust mask that is not N95 certified, respectively.
Figure 8B:
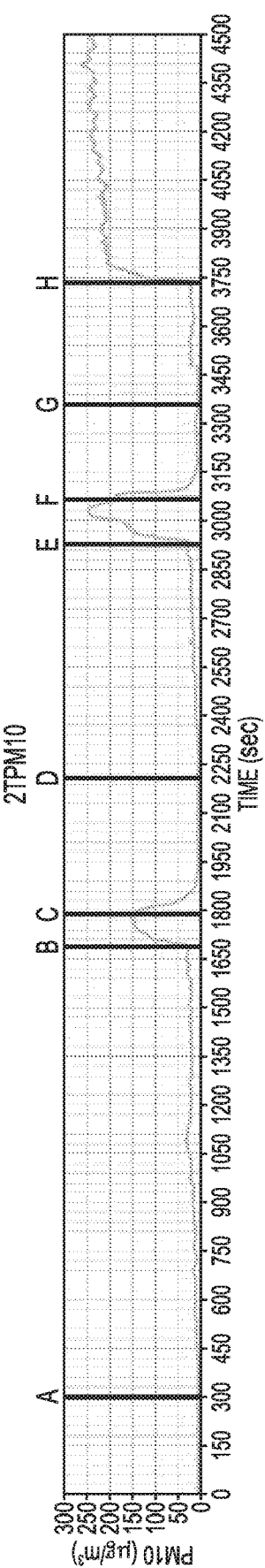
Figure 8C:
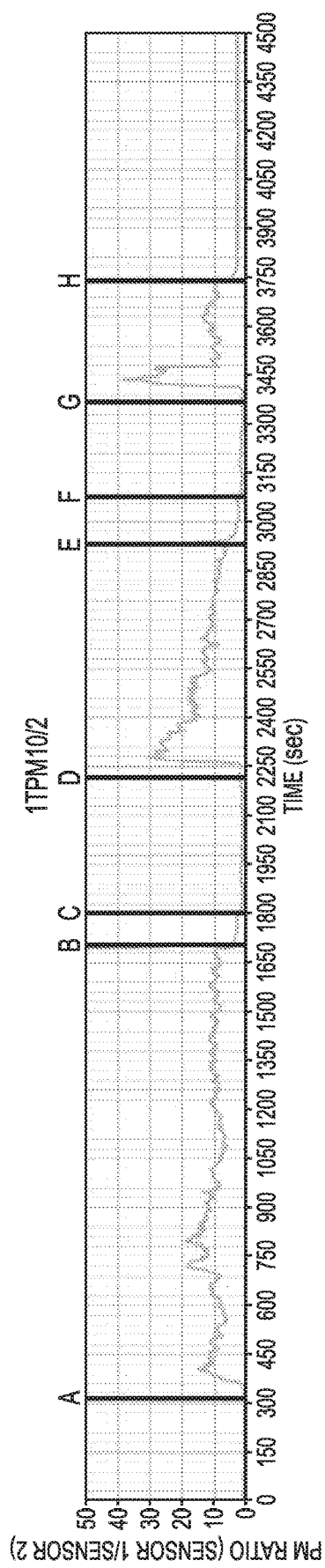

FIGS. 8A, 8B and 8C illustrate test results of the wearable mask fit sensor assembly of FIG. 7 on an N95-type mask with a breathing port, a traditional N-95 mask and a standard dust mask that is not N95 certified, respectively. Each mask was worn properly by a test subject in a clean environment then the subject sat peacefully in a room (~10'x~10') that had active burning incense as a smoke particle source. PM10 mass concentrations were measured outside the masks (FIG. 8A—sensor 1) and inside the masks (FIG. 8B—sensor 2) worn by the resting test subject. FIG. 8C illustrates the instantaneous mask fit ratio from each sensor reading. Time points A-H in the figures are described as follows.

Referring more closely to FIGS. 8A-8C, a user wore a mask and incense (smoke particle source) was lit at point A, and sensor 1 responded about 45 seconds later as expected. A roughly constant fit ratio of about 10 was maintained until point B when the mask was taken off and the tubes were removed from the wearable monitor. Sensor 2 responded as expected showing an increase in PM concentration. At point C the monitor was taken out of the smoky room and the PM values decreased quickly in both sensors as expected, and the fit ratio approached 1. At point D the process was repeated for Mask 2. For this mask an initial fit ratio approaching 30 was achieved, but the ratio gradually decreased over time until point E when the mask was taken off and the tubes again were removed from the unit. At this point the PM concentration measured by Sensor 2 rose as expected. At point F the monitor was taken to a clean environment and just as at point C, the PM values decreased in both sensors. At point G the subject entered the smoky environment wearing Mask 3. Initially a fit ratio of about 30 was achieved, but this decreased to about 10. The test subject noted that for Masks 2 and 3 he had to clamp the mask around his nose using his fingers during the initial exposure to the smoky environment. This may explain the increased fit ratios in these two cases. Finally, at point H the mask and tubes were removed and the monitor was left in the smoky room.

Figure 9:
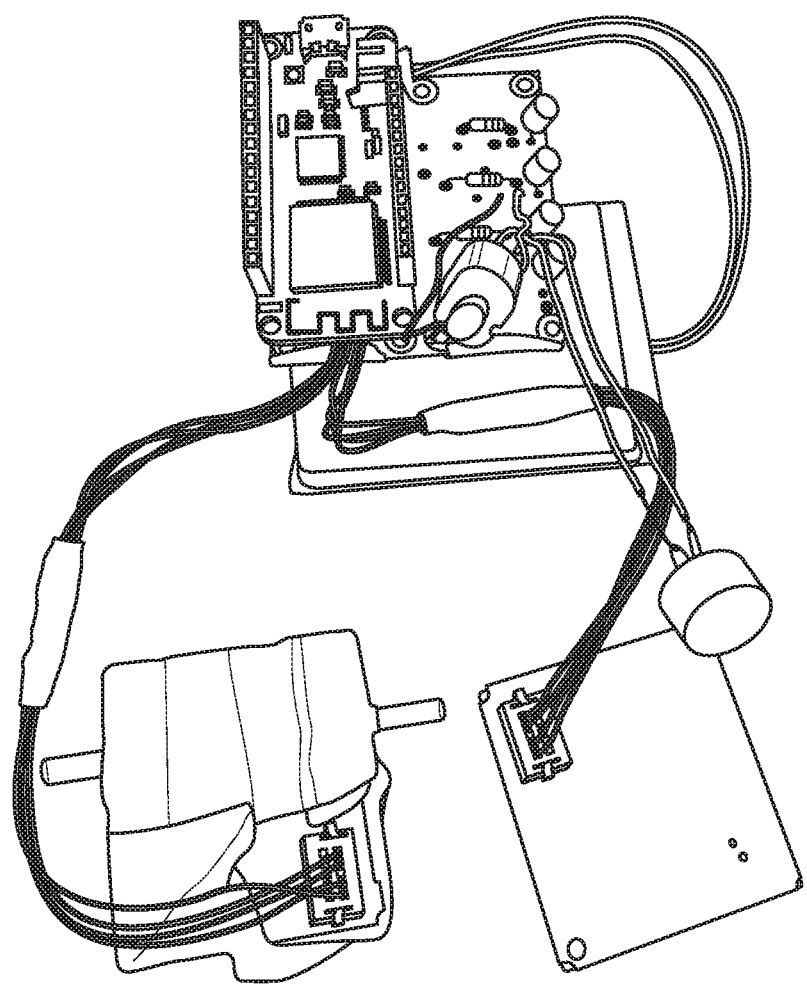
FIG. 9 illustrates an example embodiment of a wearable protection factor monitor according to the teachings herein.

FIG. 9 illustrates an example embodiment of a wearable protection factor monitor 600 shown in FIG. 7. The data can be read out to a PC via the serial connector (see FIG. 4A), but for portability it can be read out to a cellular or smartphone (see FIG. 4B) using the app USB terminal which turns the phone screen into a terminal emulator to display the data. Cellphone data output is shown in FIG. 4B. Cellphone data output from the wearable monitor reports the elapsed time since the start of the measurement, the external environmental conditions and the instantaneous fit factor ratio.

Figure 10:
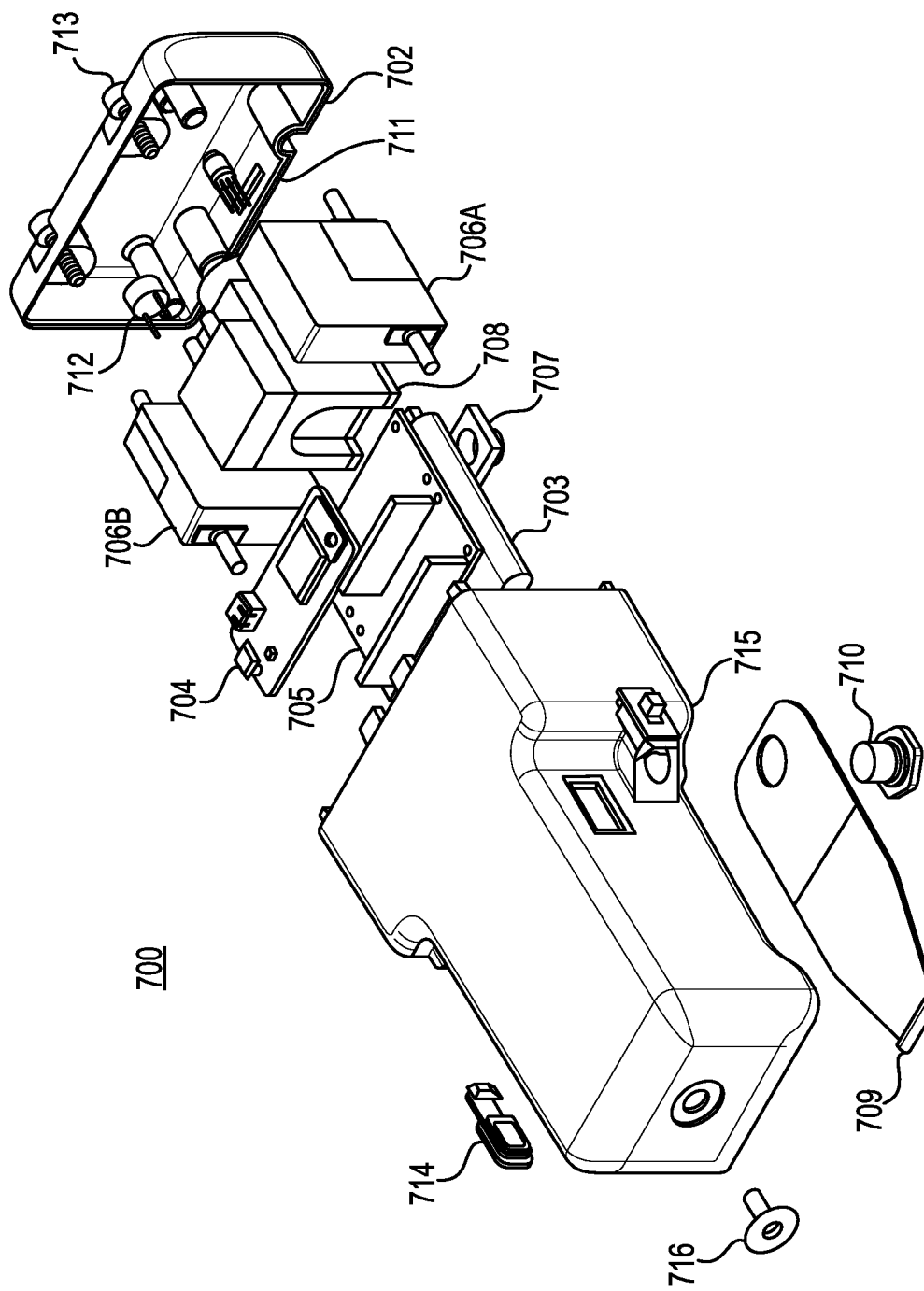
FIG. 10 illustrates another example embodiment of a wearable protection factor monitor according to the teachings herein.

FIG. 10 illustrates another example embodiment of a wearable protection factor monitor 700 according to the teachings herein. In particular, monitor 700 includes a housing comprised of a bottom 701 and a top 702, which supports most of the components therein, and are enclosed with screws 713. An optional belt clip 709 and a stud tripod mount 710. In addition, monitor 700 includes a battery pack 703 (e.g., lithium ion, 3.7V 2500 mAh) which powers a controller board 704 (AdaFruit Feather ATWINC 1500) and a circuit board 705. Board 705 is coupled to a tripod nut 707 to stabilize the assembly within monitor 700. Two optical sensors 706A and 706B (Plantower G10) are electrically coupled to circuit board 705 and to controller board 704 and include hose receiver assemblies for connection to a mask and for collecting outside environment air, respectively, and include exhaust assemblies that are connected together and to an instrument pump 708 for creating a consistent airflow through monitor 700. For a visual alert, the monitor includes a three-color LED 711 mounted near top 702, and for a haptic or vibrational alert to a user a buzzer 712 is also mounted near top 702. A USB plug 714 is included on the housing along with a switch slide 715 and a tube fitting 716.

Figure 11:
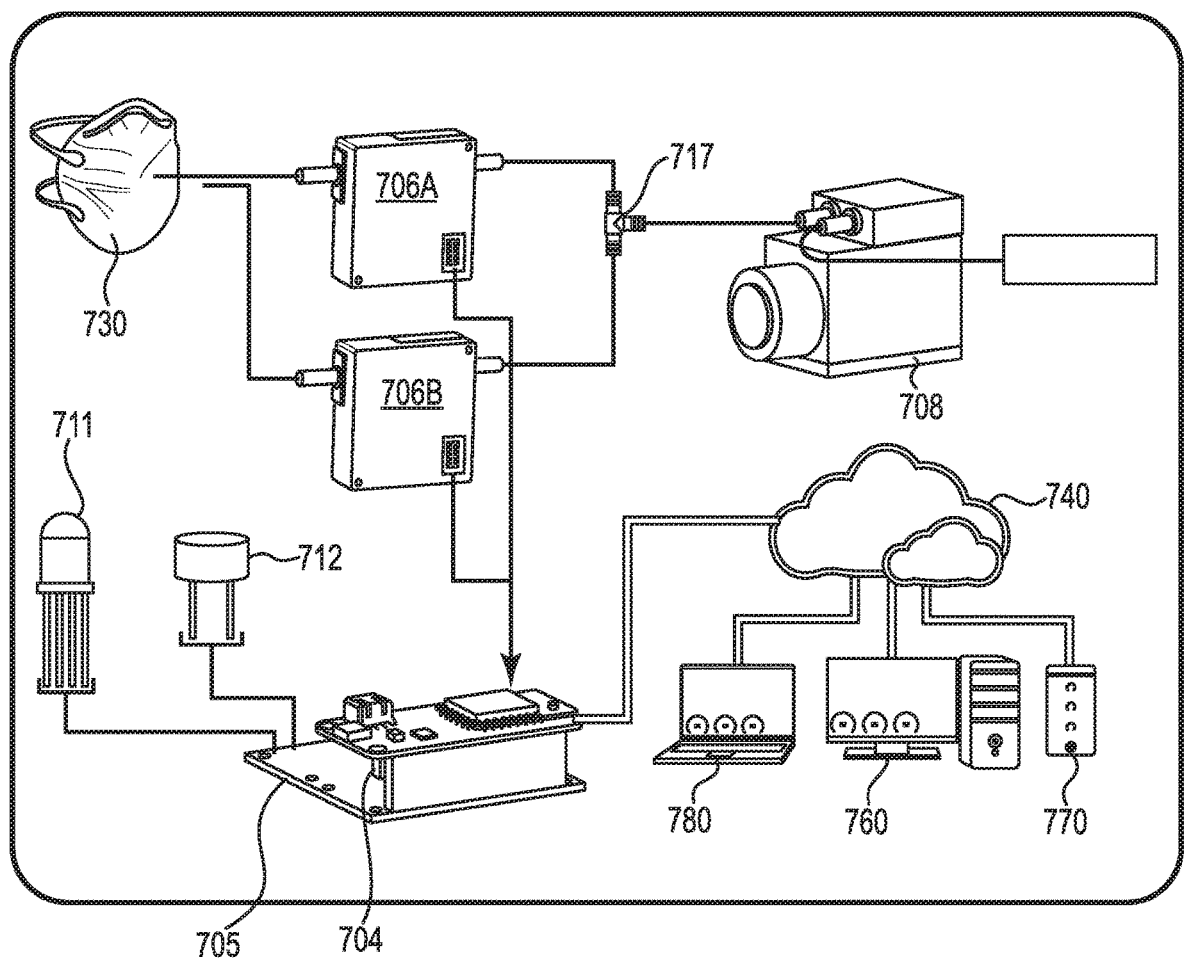
FIG. 11 illustrates a system layout of a wearable protection factor monitoring system for a user with a dashboard-type display and communication capability to the cloud.

FIG. 11 illustrates a system layout of a wearable protection factor monitoring system 750 for one or more mask users, using monitor 700, which includes a dashboard-type display and communication capability to the cloud. This system embodies the main concepts of the protection factor monitoring system of including a dynamic system to allow proper functioning of the wearable monitor, a data processing system that allows for properly articulating the raw data results into meaningful information and provide instant indications to the user's device, and a user interface which receives the processed data and displays critical parameters to the user (such as PFs, particle density and particle count gauges).

In this example embodiment, optical sensor 706A is coupled to a mask 730 while optical sensor 706B collects air samples close to but outside of mask 730. The exhausts of both sensors are coupled with a t-coupler 717 (or y-coupler) which in turn is coupled to pump 708 to create the continuous, steady air flow for particle measurement, faster than the response of the previous embodiment, and to eliminate any backstreaming into the sensors. Another port of pump 708 is directed to ambient air. System 750 also includes a wireless connection from an Aduino controller 704 (e.g., Adafruit Feather MO board with WiFi) to the cloud 740 directly or to any one of a desktop 760, a smartphone 770 or a laptop 780 for analyzing and displaying fit factors for the mask user. The displays of the various computing devices provide dashboard-type images for ease of use. In this example embodiment, the major components of the data processing module are the Adafruit Arduino, the optical sensors, a PCB board, an electronic buzzer, a multi-color LED and a haptic vibration motor. The data collected by the sensors will be transmitted to the Arduino and processed by its serial receiver (the Adafruit module is compatible with 802.11b/g/n standard). While the Arduino is reading the sensor data it is controlling the alert system (LED, buzzer, etc.) such that when the particle concentration or PF exceeds a safety value, one or all of the alert components will be activated. The PCB board connects all of the data processing components.

In this example embodiment, the Adafruit board with WiFi allows for real time data to be displayed and monitored and allows for multiple devices to be viewed simultaneously. Now a single person can be located in a central location and track the PFs of multiple workers. This could also be utilized as an alert system as the stationed worker can inform individual workers when they are exposed to an unsafe environment. This would allow the worker to focus on their job rather than constantly watching their fit test monitor in some situations or can help with tracking mask-use compliance in an overall workplace location.

The LED and audio indicators will also useful alerts for individual workers to provide real-time alerts, especially in dangerous situations. An audio indicator can include an audio buzzer (operates at about 60-85 db) and/or a haptic vibration motor (operates at about 8000 rpm) to provide the immediate alert to the worker by sound or by tactile feel as well. Finally, in another embodiment, a smell alert can also be incorporated into the alert system (especially when dealing with some disabled workers) such as by pumping an ester into the respirator mask that is detectable by the user.

Figure 12A:
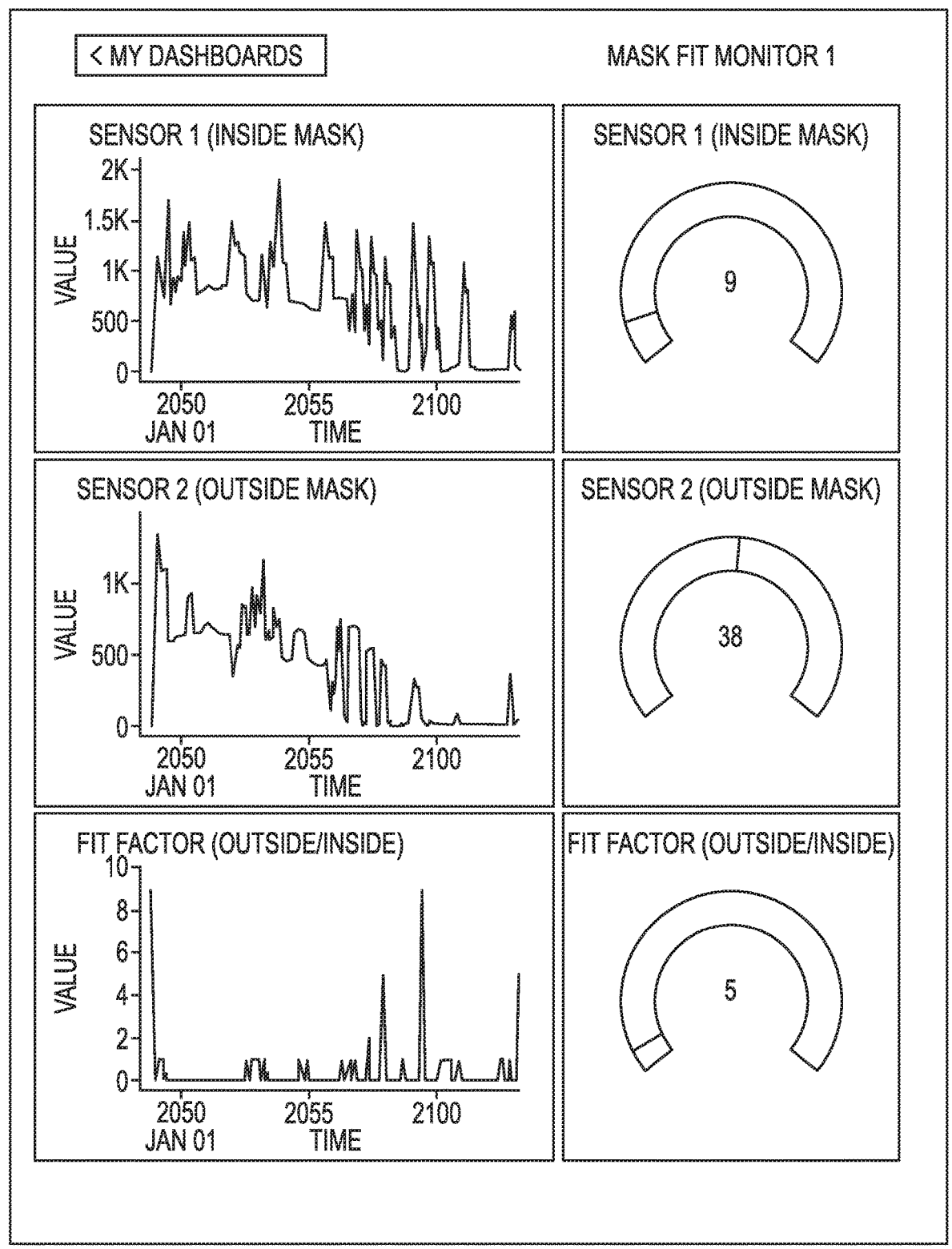
FIG. 12A-12C illustrate an example of cloud dashboard displays of fit factor results for a good environment, a bad environment with N95 mask protection and a bad environment with poor mask protection, respectively
Figure 12B:
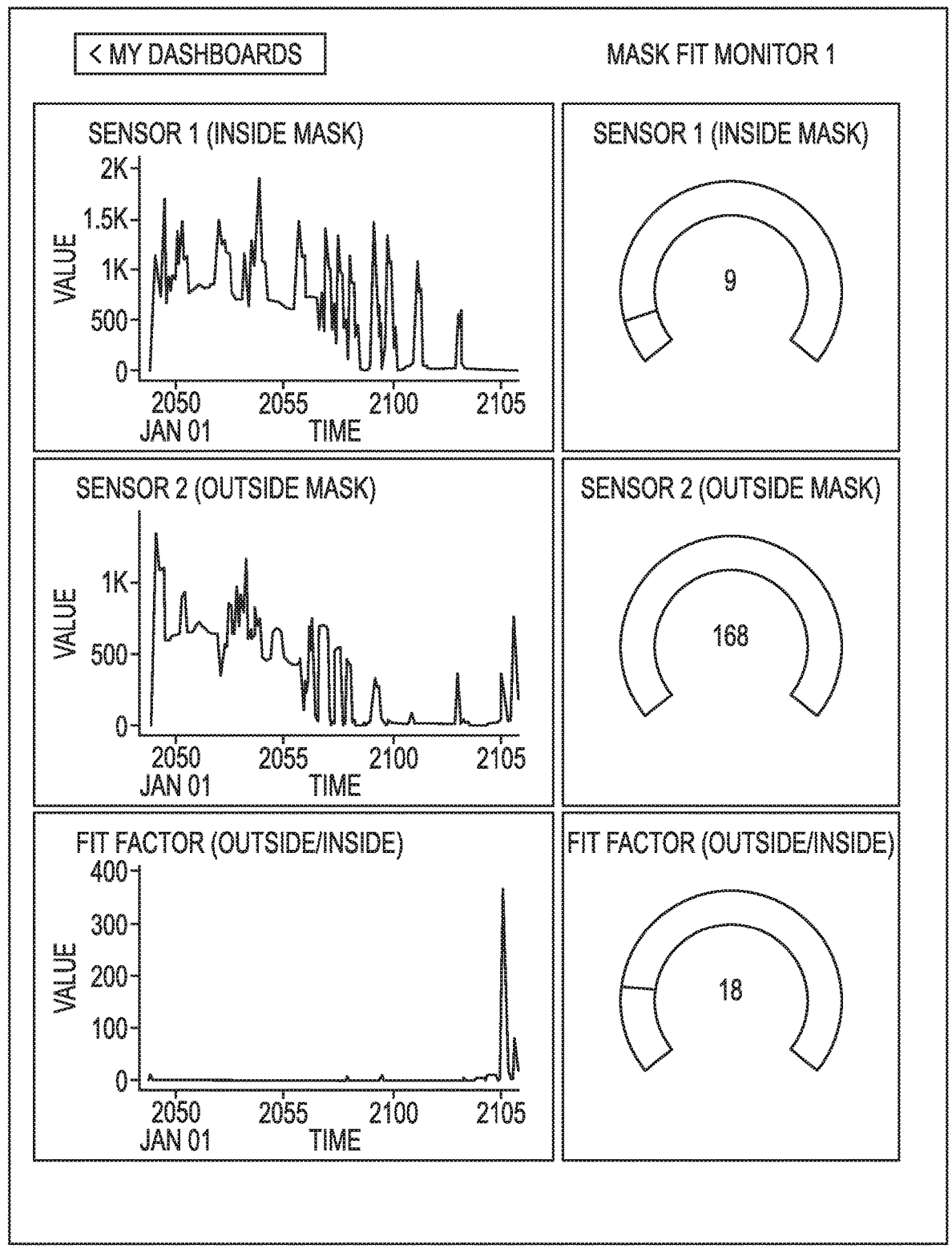
Figure 12C:
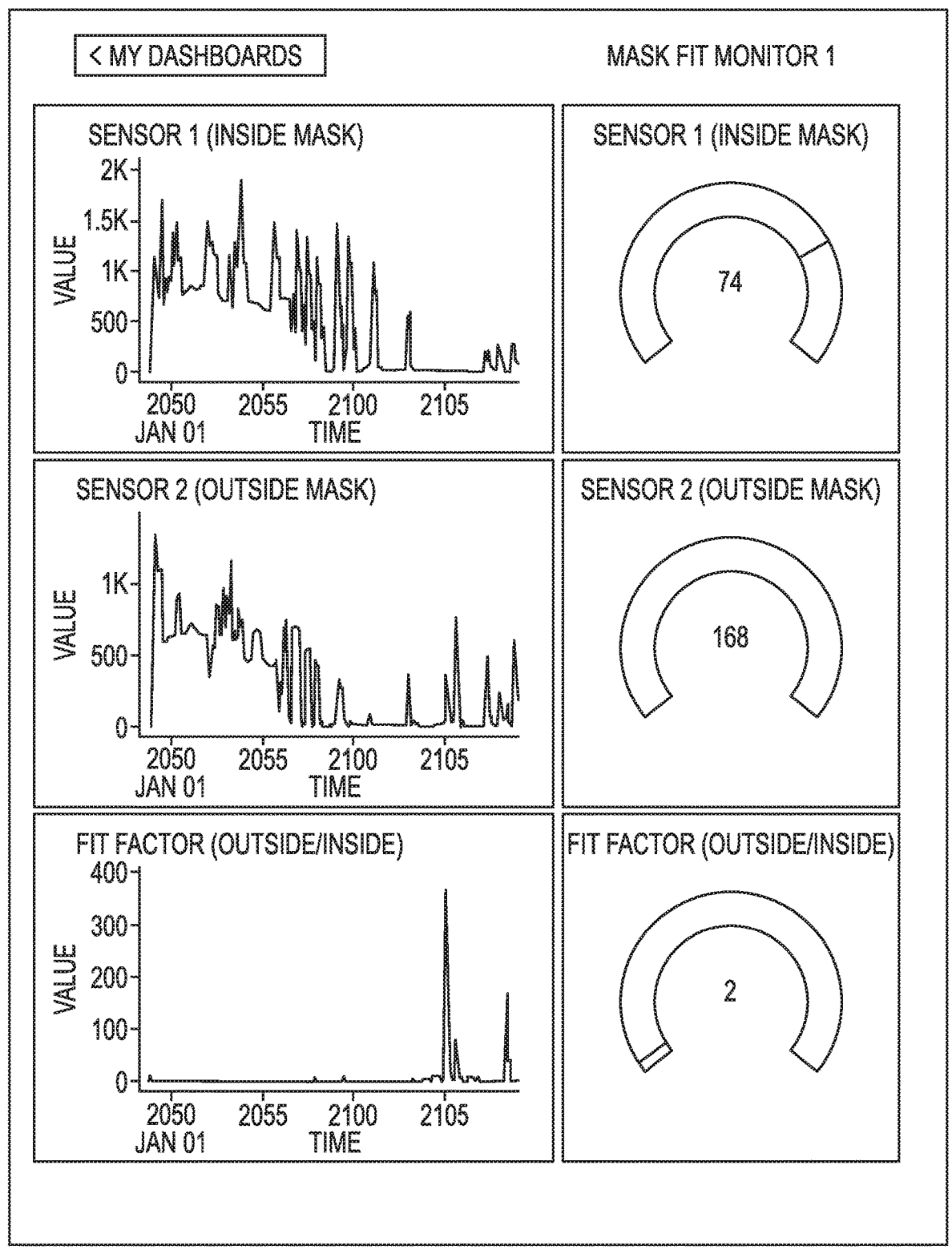

FIG. 12A-12C illustrate an example of cloud dashboard displays of fit factor results for a good environment, a bad environment with N95 mask protection and a bad environment with poor mask protection, respectively. In particular, the various displays report a time trace (plot) and current value (gauge) of air quality inside the mask (sensor 1), outside the mask (sensor 2) and the fit factor (sensor 2/sensor 1). Readings are updated every 5 seconds and multiple data feeds are possible. Time-stamped data are stored online and downloaded for analysis.

Figure 13:
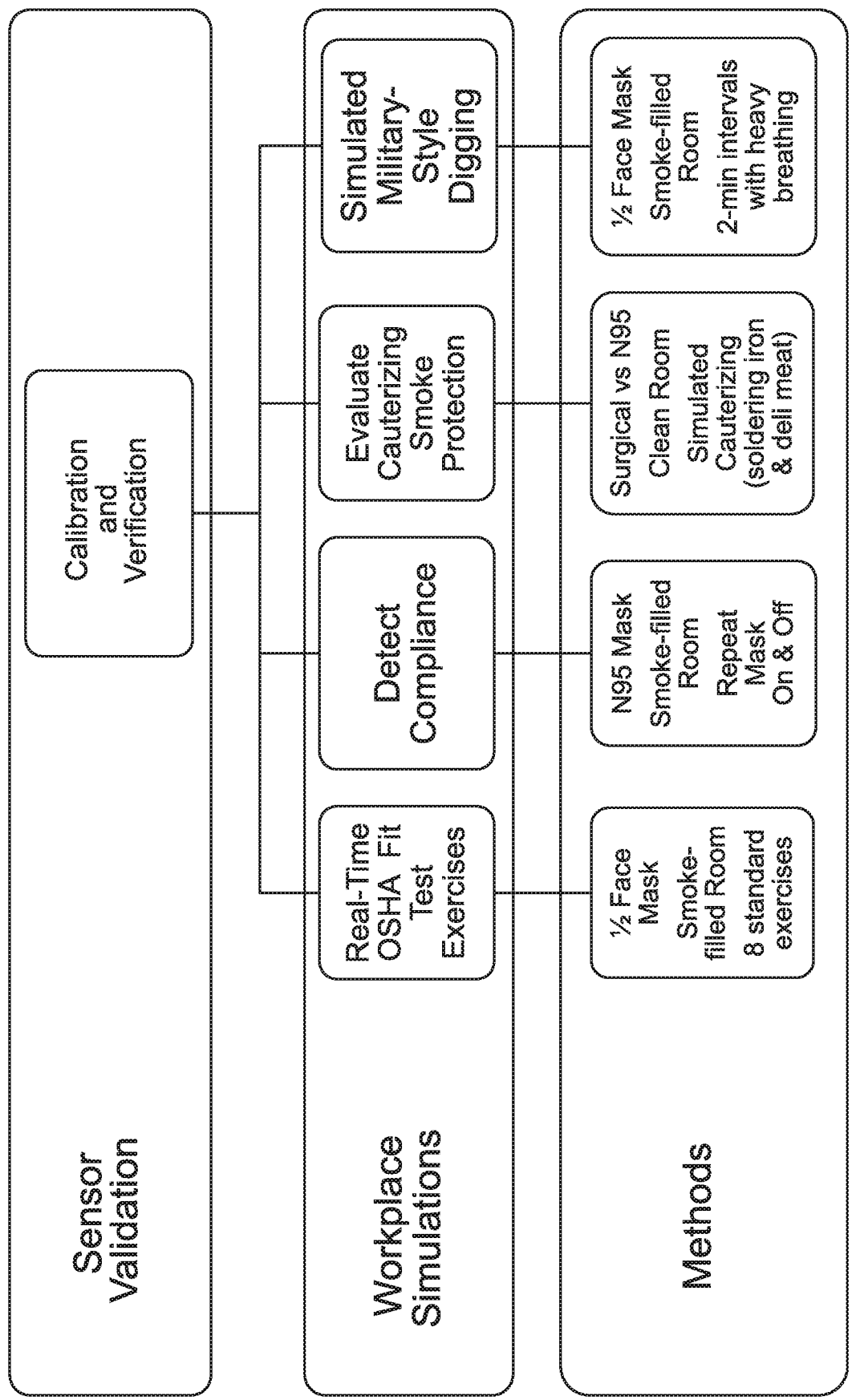
FIG. 13 illustrates a process flow of several workplace simulation applications using the wearable protection factor monitoring system as taught herein.

FIG. 13 illustrates a process flow of several workplace simulation applications using the wearable protection factor monitoring system as taught herein. In particular, a real-time OSHA fit test set of exercises is performed with a ½-face mask; a compliance detection exercise is performed with an N95 mask and a smoke filled room with repeated Mask on/off exercises; measuring smoke exposure for medical workers from simulated cauterization of mammal tissue using surgical versus N95 masks; and a simulated military-style digging exercise using a smoke filled room. The following figures illustrate more specifically the inside the mask results and the various form fit or protection factors provided continuously for each application.

Figure 14:
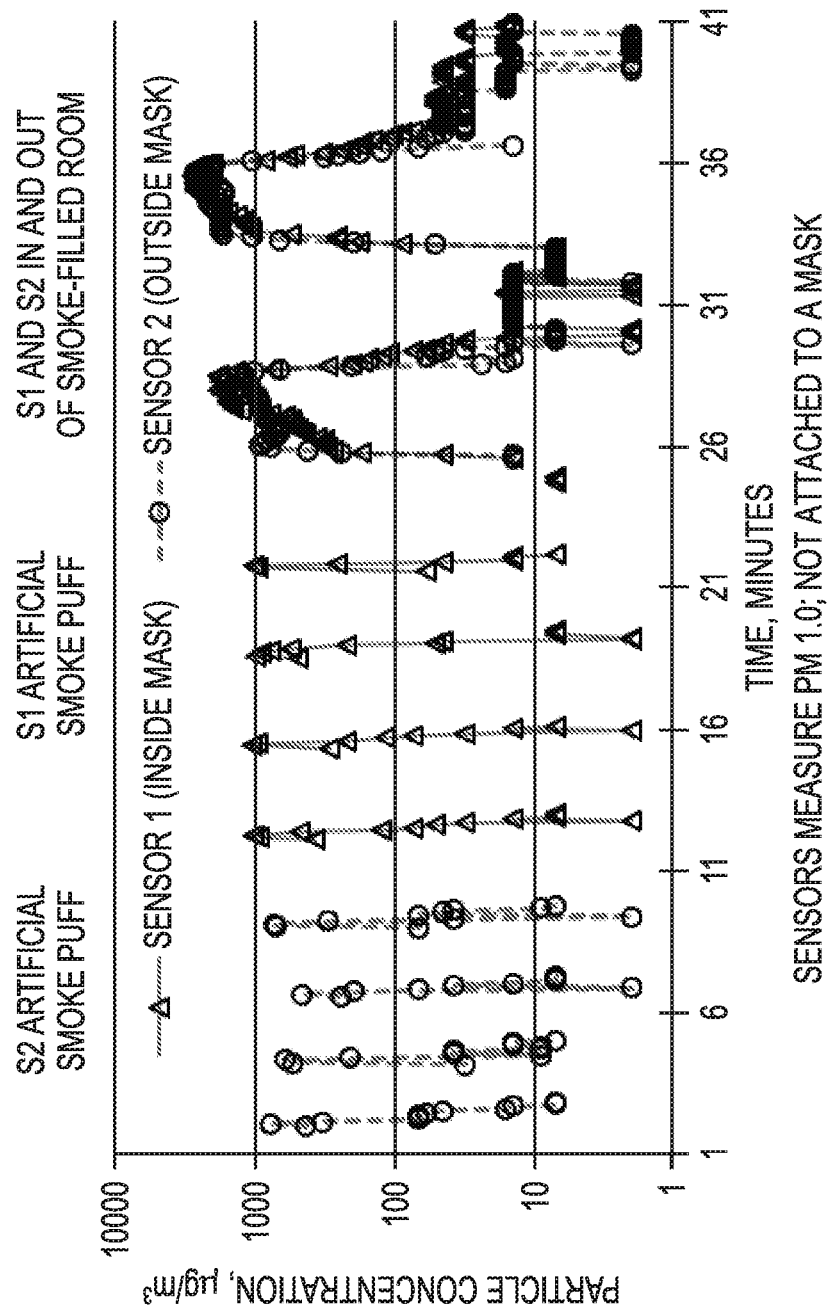
FIG. 14 illustrate a sensor validation process and a sensor calibration process conducted prior to performing protection factor monitoring.

FIGS. 14A and 14B illustrate a sensor validation process and a sensor calibration process conducted prior to performing protection factor monitoring. The first step in implementing any of the protection monitors described herein is to perform validation and sensor calibration by subjecting each sensor to a smoke sample and then determine how closely each performed. The sensors are calibrated for measuring PM 1.0 (mass concentration of particles less than 1 μm diameter) up to 2000 μg/m$^3$. Each sensor responses within 5 seconds to a short (less than one second) puff of artificial smoke and then clears the particles within 40 seconds. There is no cross-talk between sensors and the sensors are very well matched in their response to entering and leaving a smoke-filled room over more than a 100× change in PM 1.0 concentration.

Figure 15A:
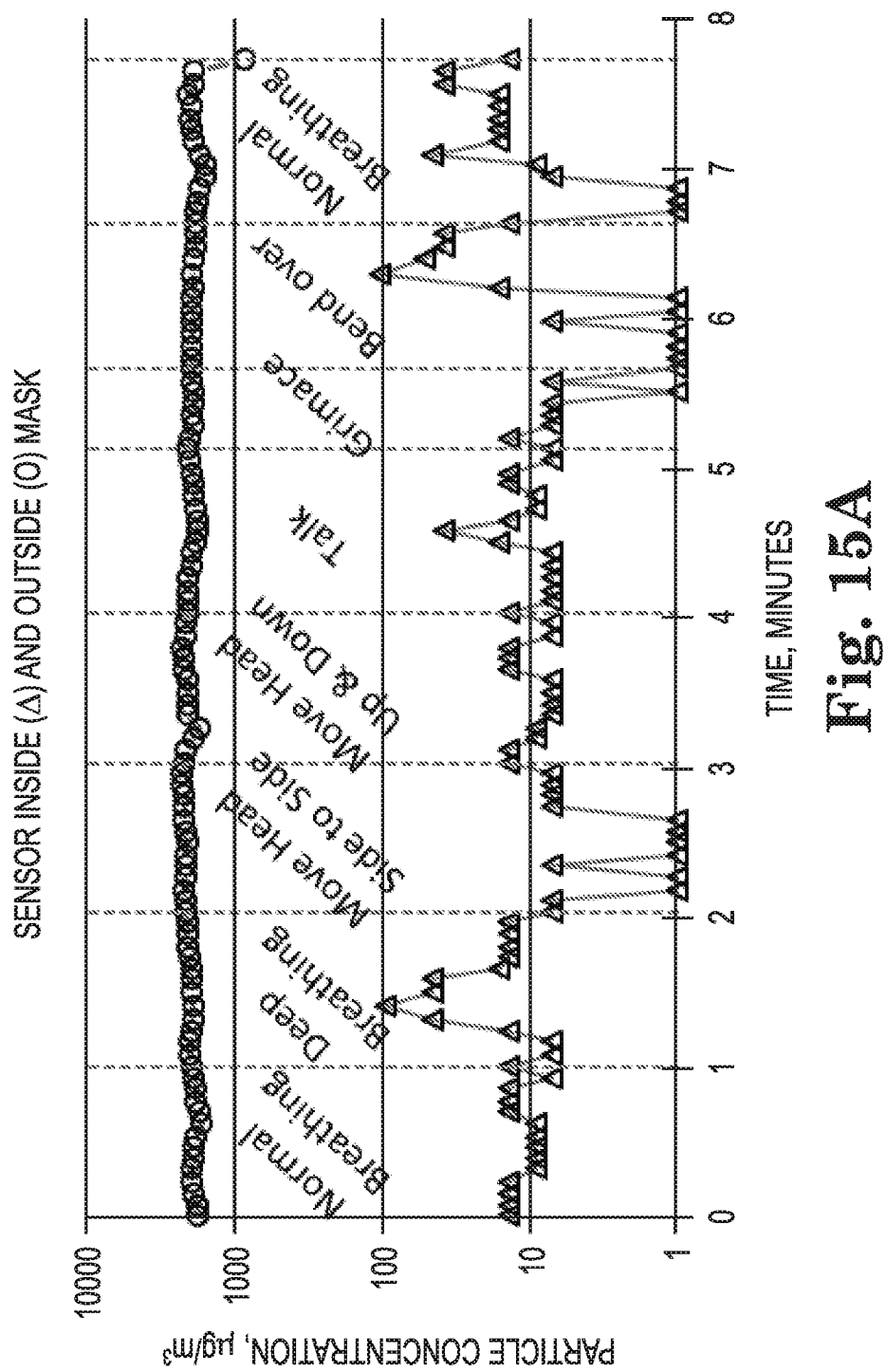

FIGS. 15A and 15B illustrate how the protection monitor system is used in a real time OSHA mask fit example to generate particle readings inside and outside a mask and to generate a protection factor, respectively. Generally, there is a need to measure respirator fit during work activities to see what activities cause masks to leak as current approaches use very bulky CPC-based devices. In this example, the subject is asked to perform OSHA's 8 exercise sequence using a ½-face respirator in a smoked-filled room (FIG. 15A). Protection factors exceeding 100 are achieved but deep breathing, talking and bending over have periods where the protection factors (PF) are not at acceptable levels (FIG. 15B). This exercise does provide the user the times/events in which the PF is at unacceptable levels and such information is provided to the user immediately and continuously to protect them, such information useful for, for example, monitoring and training purposes.

Figure 16A:
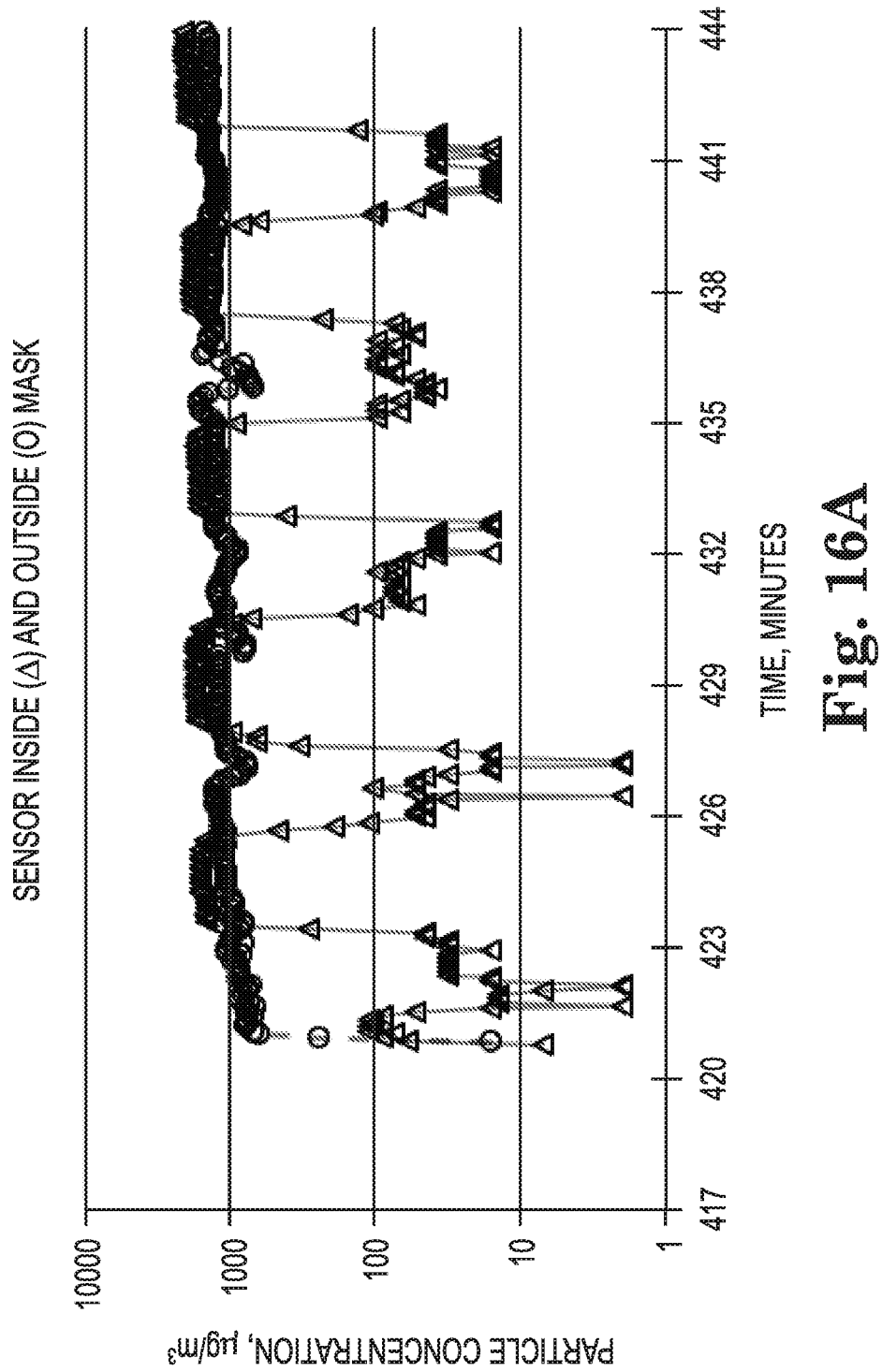
FIGS. 16A, 16B and 16C illustrate how the protection monitor system is used in a workplace detection example to generate particle readings inside and outside a mask, to generate a protection factor signaling mask use compliance and to demonstrate mask use compliance over various trials, respectively.
Figure 16B:
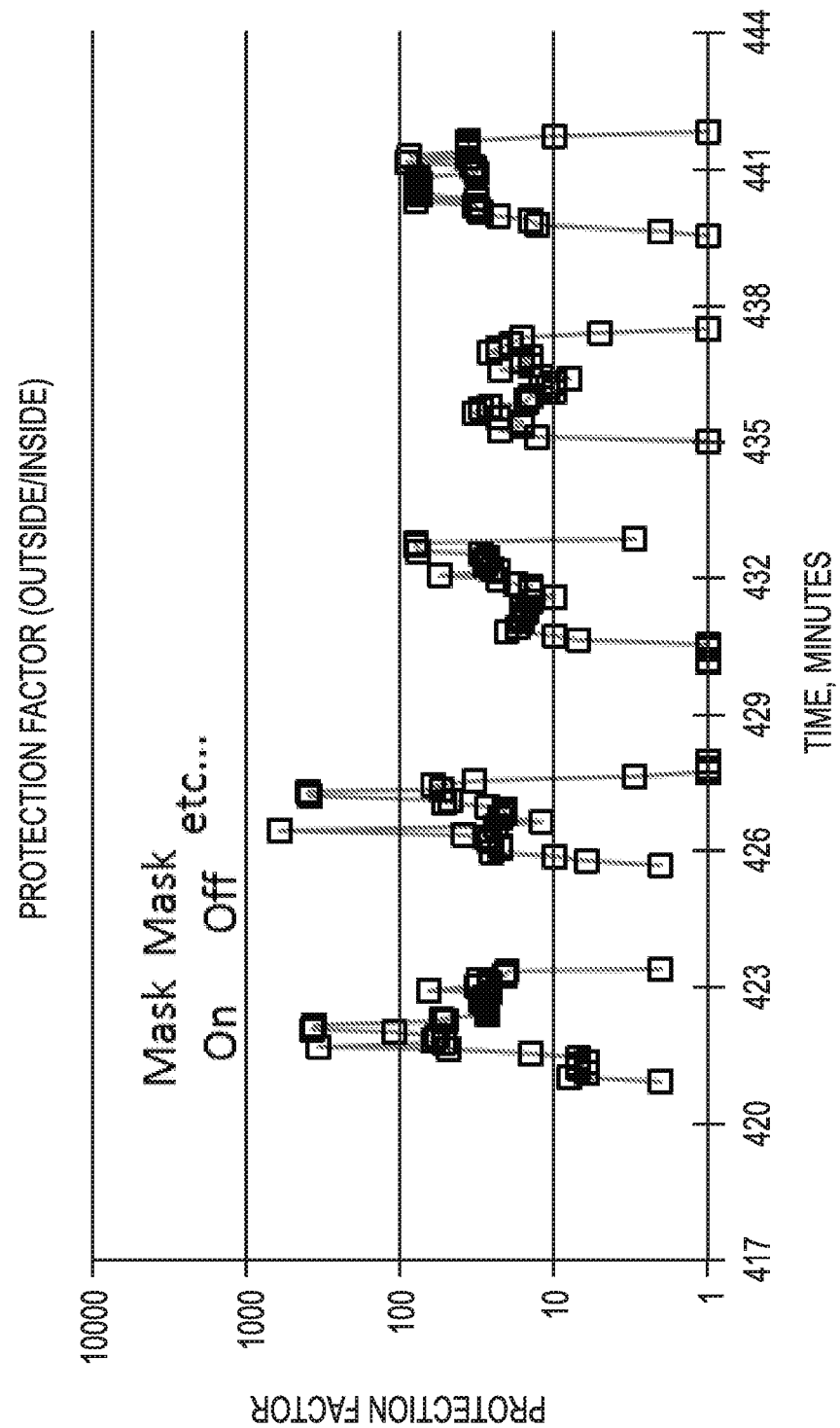
Figure 16C:
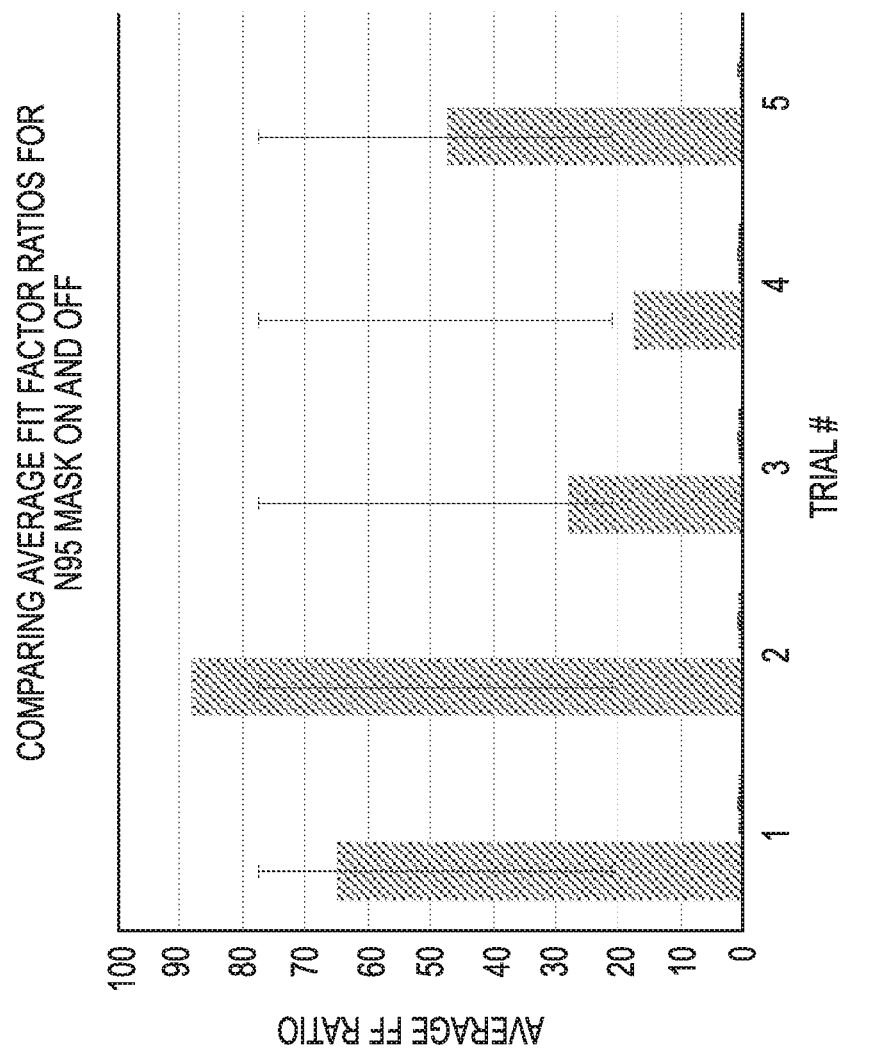

FIGS. 16A, 16B and 16C illustrate how the protection monitor system is used in a workplace detection example to generate particle readings inside and outside a mask, to generate a protection factor signaling mask use compliance and to demonstrate mask use compliance over various trials, respectively. In this example, compliance is the goal as supervisors are trying to monitor and enforce use of safety masks in an environment with poor air quality. In this exercise, the subject enters a smoke-filled room with an N95 mask on and then removes it for about 2 minutes and then replaces it for about 2 minutes. This exercise is repeated several times. Use of the mask is easily discernable from the various PF peaks illustrated in FIGS. 16B and 16C even for a mask that may not be a full facial mask. Hence, the data indicates that real-time compliance and exposure is possible and can be determined remotely depending on the wireless data transmission system used.

Figure 17:
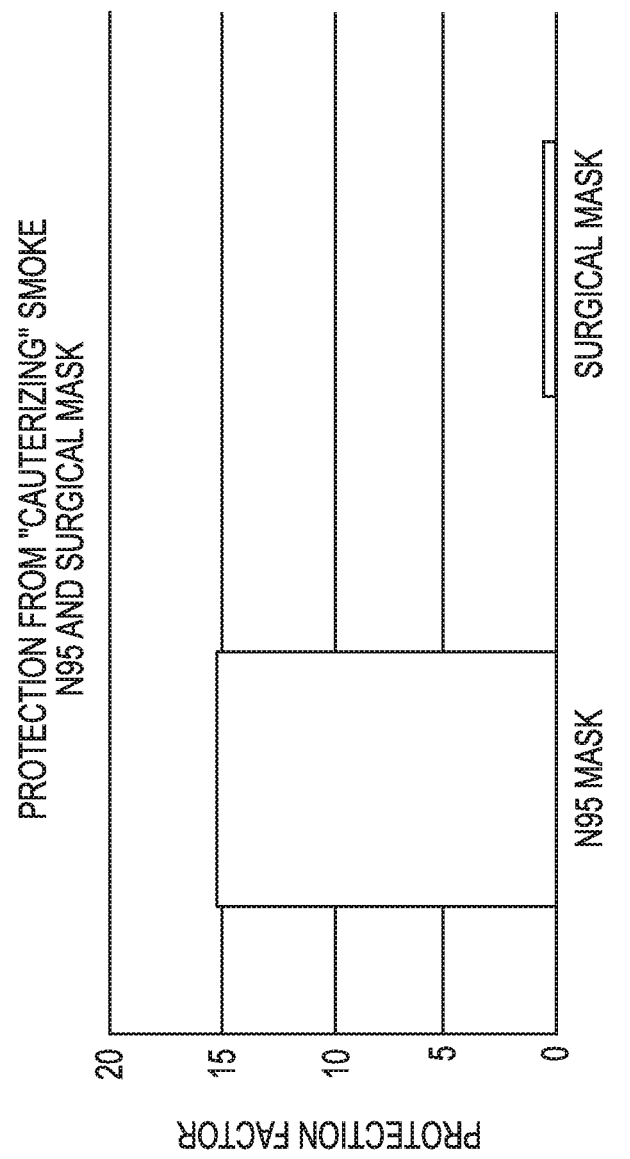
FIG. 17 illustrates how the protection monitor system taught herein measures surgical face mask protection versus an N95 mask protection to a medical worker during a simulated cauterization procedure.

FIG. 17 illustrates how the protection monitor system taught herein measures surgical face mask protection versus an N95 mask protection to a medical worker during a simulated cauterization procedure. Over ½ million healthcare workers are exposed to tissue/surgical cauterization smoke annually, which can lead to an array of health effects. Surgical masks, which are the standard practice for liquid and particulate protection, mainly for the patient, do not appear to be adequate to safeguard the workers. In this example, a soldering iron and deli meat was used to simulate the cauterization experience, alternating smoke generation five times between 2-minute periods of rest in a clean environment (background is around PM 1.0-~0 μg/cm$^3$). From the graph, it is evident that surgical masks do not offer protection from smoke particles while the n95 mask offers some protection as the protection factor is about one for the surgical mask and about 15 for the N95 mask.

Figure 18A:
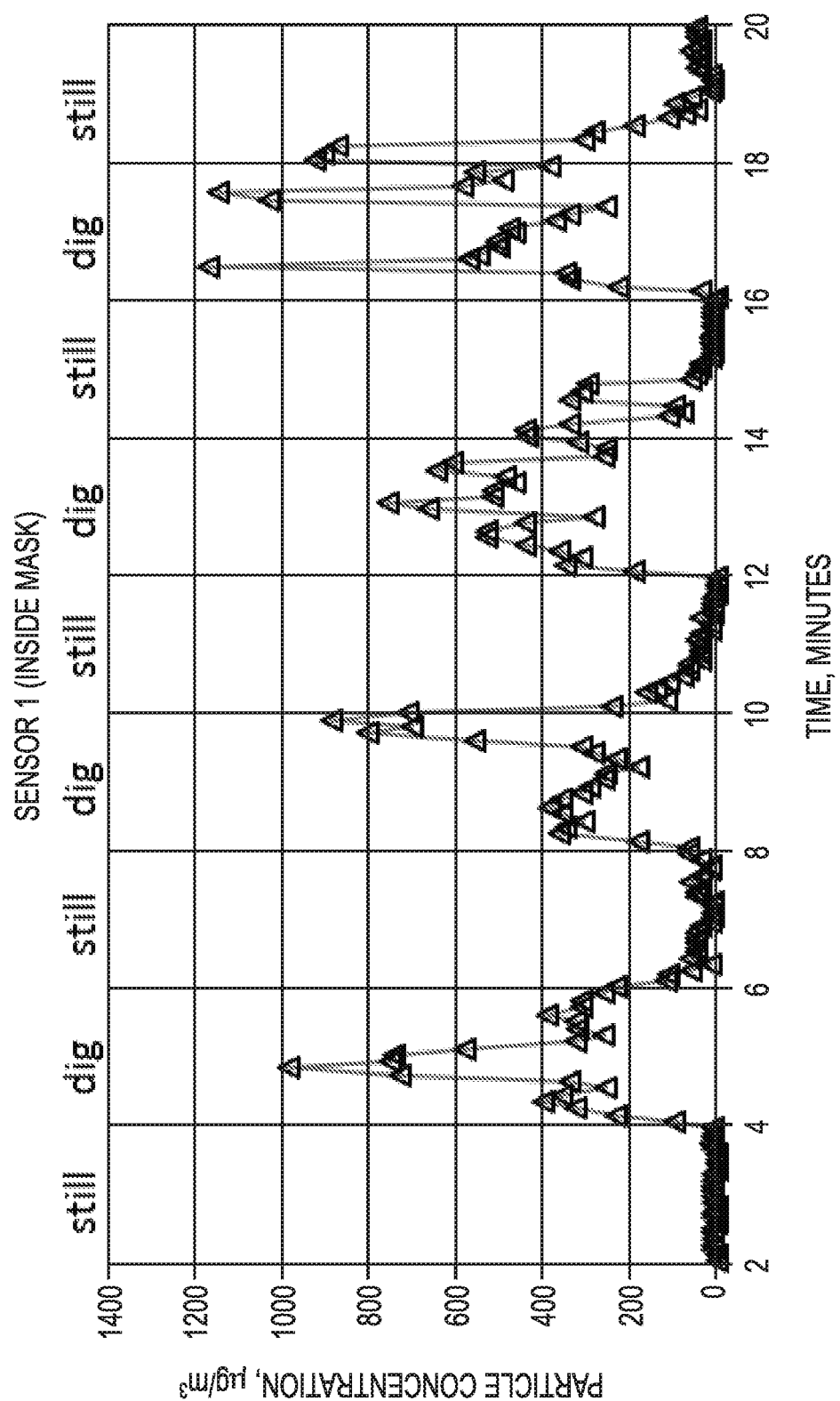
Figure 18B:
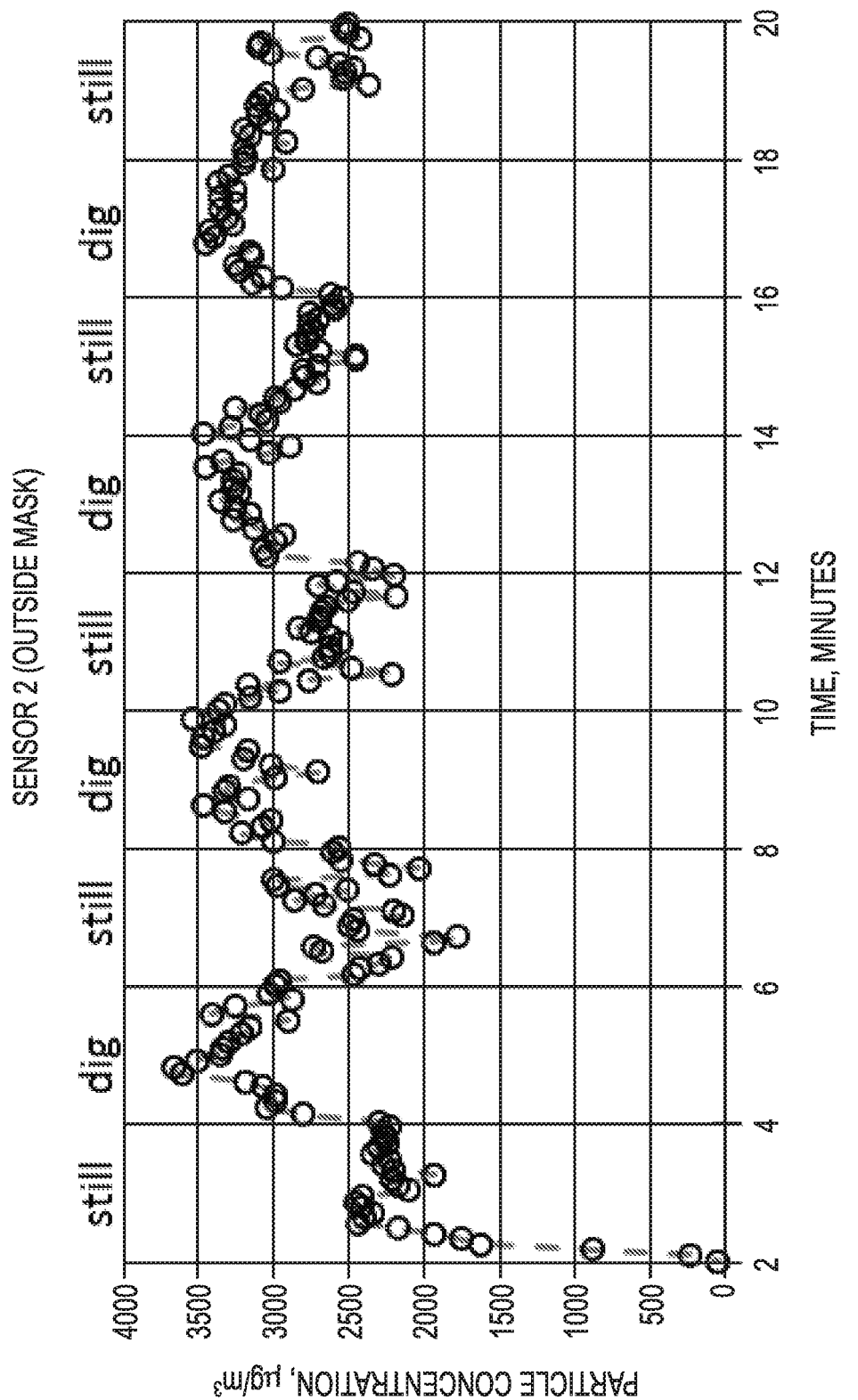

FIGS. 18A, 18B and 18C illustrate how the protection monitor system is used in a military exercise example to generate particle readings inside a protective mask, outside a mask protective mask, and to generate a protection factor signaling mask protection to a soldier during various points in performing the exercise, respectively. In particular, uncertainty exists about the protection that military personnel receive from current military masks. Various masks were evaluated using an assessment system that meets DOD specifications which require that a system volume be less than 500 cm$^3$, that the system provide WiFi communications, that it have 4 hours of battery life and is capable of measuring a fit factor of greater than 50K. When subjected to a digging exercise the results or performance of the mask changed compared to its stationary performance. In a smoke-filled environment the subject wearing a ½-face respirator, alternated 5 times between 2-minute periods of rest and 2 minutes periods of simulated digging with heavy breathing. FIG. 18A illustrates the particles measured inside the mask and FIG. 18B the measured the particles outside the mask, and the resulting protection factor is illustrated in FIG. 18C. While digging it appears that the mask leaks significantly and the protection factor drops significantly as well. The mask returns to acceptable levels once the digging stops and some normal breathing returns.

In a related embodiment, software apps and hardware can be used to simplify data logging, such as an integrated SD card. In addition, wireless communication with a smartphone would also facilitate operative coupling to the phone without a cable, or broadcasting via WiFi to the cloud would enable multiple units to be monitored simultaneously. In another embodiment, adding indicators such as lights or an audible alarm to announce a poor fit condition would also be advantageous. In yet other related embodiments, clamping the tube to the user or using a lighter weight tube so it does not pull on the mask would enhance performance. Eliminating the condensation that sometimes forms in the tubes using a heating means or by adding increased or variable flow, with the added benefit of a faster or more controlled sensor response, would enhance performance. In yet other example embodiments, the tube connecting the mask to the wearable monitor is eliminated by attaching the monitor directly to the mask or having a shoulder or helmet arrangement would also reduce the tube length needed. Such a wearable monitor may also include the optical sensor or sensors contemplated above or obviously any other particle or particle mass sensing detector such as a film bulk acoustic resonator, compact CPC (condensation particle counter) device or similar particle counting or sensing device.

In other related embodiments, the wearable monitor accuracy can be improved with methods for drawing air out of the mask for sampling by the sensors; preventing back flow into the mask or sensors; and methods that take into account humidity in and around the mask.

The following patents are incorporated by reference in their entireties: U.S. Pat. Nos. 8,312,761; 8,708,708 and 6,125,845.

The foregoing descriptions present numerous specific details that provide a thorough understanding of various embodiments of the invention. It will be apparent to one skilled in the art that various embodiments, having been disclosed herein, may be practiced without some or all of these specific details. In other instances, components as are known to those of ordinary skill in the art have not been described in detail herein in order to avoid unnecessarily obscuring the present invention. It is to be understood that even though numerous characteristics and advantages of various embodiments are set forth in the foregoing description, together with details of the structure and function of various embodiments, this disclosure is illustrative only. Other embodiments may be constructed that nevertheless employ the principles and spirit of the present invention. Accordingly, this application is intended to cover any adaptations or variations of the invention.

What is claimed is:

1. A wearable respirator fit monitor comprising:
   a first and a second particle counter, each particle counter adapted to measure particle concentration in an aerosol sample, the first particle counter having an inlet for receiving a first aerosol sample and the second particle counter having an inlet for receiving a second aerosol sample, wherein the particle counter device is one of an optical sensor, a condensation particle counter (CPC) device and a particle mass sensing detector;
   a controller unit adapted to receive a first and second input signals corresponding to particle concentrations in each of the first and second aerosol samples received from each of the first and second particle counters, wherein the controller unit generates a particle concentration parameter corresponding to a ratio of the first and second input signals received from the first and second particle counters; and
   a power source for powering the controller unit and the particle counters.

2. The wearable respirator fit monitor according to claim 1 further comprising an auxiliary pump coupled to an exhaust of the first and second particle counters to facilitate a continuous airflow through the particle counters.

3. The wearable respirator fit monitor according to claim 2 wherein the controller unit generates a protection factor parameter corresponding to a quantitative effectiveness of a mask fitting a user.

4. The wearable respirator fit monitor according to claim 3 further comprising a user warning device responsive to a protection factor parameter exceeding a predefined level, the user warning device initiating a signal to the user that the protection factor parameter has been exceeded.

5. The wearable respirator fit monitor according to claim 4 wherein the user warning device is selected from the group consisting of an LED, a vibrational speaker or transducer and an audio indicator.

6. The wearable respirator fit monitor according to claim 1 further comprising a communications port communicatively coupled to the controller unit to transmit particle collection data to a display device.

7. The wearable respirator fit monitor according to claim 1 wherein the controller unit further comprises a communications device for wirelessly transmitting particle collection data to one of a display device, a wired network and an external communications network.

8. A wearable respirator fit monitoring system including the fit test monitor of claim 1, further comprising:
   a wearable mask for a user configured to provide the first aerosol sample to an inlet of the first particle counter;
   a device for collecting and directing the second aerosol sample to the second particle counter; and
   a smart device operatively coupled to the controller unit, the smart device configured to display data to the user and for data logging and storage of data, wherein the controller unit generates a fit factor parameter corresponding to a quantitative effectiveness of the mask fitting the user.

9. The wearable respirator fit monitor of claim 1, wherein the power source is a battery.

10. The wearable respirator fit monitor of claim 1 comprising a housing that contains: the first particle counter, the second particle counter, the controller, and the power source.

11. The wearable respirator fit monitor of claim 1, wherein:
   the first particle counter is coupled to the respirator and receives the first aerosol sample from inside of the respirator, and
   the second particle counter receives the second aerosol sample from outside of the respirator.

12. A wearable respirator fit monitor comprising:
   a particle counter adapted to measure particle concentration in an aerosol sample, the particle counter having an inlet for receiving an aerosol sample, wherein the particle counter is one of an optical sensor, a condensation particle counter (CPC) device and a particle mass sensing detector;
   a controller unit adapted to receive a first and second input signals corresponding to particle concentrations in each of a first and second aerosol samples received from the particle counter, wherein the controller unit continuously generates a real time particle concentration parameter corresponding to a ratio of the first and second input signals received from the particle counter;
   a switching valve device coupled to the particle counter and adapted to facilitate sampling a first aerosol sample and a second aerosol sample using the particle counter, wherein the controller unit actuates the switching valve to generate the first and second input signals from the particle counter; and
a power source for powering the controller unit and the particle counter.

13. The wearable respirator fit monitor according to claim 12 further comprising an auxiliary pump coupled to an exhaust of the particle counter to facilitate a continuous airflow through the particle counter.

14. The wearable respirator fit monitor according to claim 13 wherein the controller unit generates a protection factor parameter corresponding to a quantitative effectiveness of a mask fitting a user.

15. The wearable respirator fit monitor according to claim 14 further comprising a user warning device responsive to a protection factor parameter exceeding a predefined level, the user warning device initiating a signal to the user that the protection factor parameter has been exceeded.

16. The wearable respirator fit monitor according to claim 12 wherein the controller unit further comprises a communications device for wirelessly transmitting particle collection data to at least one of a display device, a wired network and an external communications network.

17. A wearable respirator fit monitoring system including the fit test monitor of claim 12, further comprising:
a wearable mask for a user configured to provide the first aerosol sample to an inlet of the particle sensor; and
a smart device operatively coupled to the controller unit, the smart device configured to display data to the user and for data logging and storage of data, wherein the controller unit generates a fit factor parameter corresponding to a quantitative effectiveness of the mask fitting the user.

18. The wearable respirator fit test monitor according to claim 12 further comprising a display included on the wearable unit or a remote display, wherein the display or remote display continuously shows a real time fit factor or an indicator of the real time effectiveness of fit.

19. A method of monitoring fit of respirator using a wearable respirator fit monitor, the method comprising:
measuring particle concentration in an aerosol sample using a first and a second particle counter, the first particle counter having an inlet for receiving a first aerosol sample and the second particle counter having an inlet for receiving a second aerosol sample, wherein the particle counter is one of an optical sensor, a condensation particle counter (CPC) device and a particle mass sensing detector;
receiving at a controller unit first and second input signals corresponding to particle concentrations in each of the first and second aerosol samples received from each of the first and second particle counters, wherein the controller unit generates a particle concentration parameter corresponding to a ratio of the first and second input signals received from the first and second particle counters; and
powering the controller unit and the particle counters.

20. The method of claim 19 further comprising the step of exhausting with an auxiliary pump the first and second particle counters to facilitate a continuous airflow through the particle counters.

21. The method of claim 19 further comprising the step of generating with the controller unit a protection factor parameter corresponding to a quantitative effectiveness of a mask fitting a user.

22. The method of claim 19 further comprising the step of transmitting the particle collection data to one of a display device, a wired network or a wireless network.

23. The method of claim 19 further comprising the steps of:
providing a wearable mask for a user configured to provide the first aerosol sample to an inlet of the first particle counter;
collecting and directing the second aerosol sample to the second particle counter; and
displaying data on a smart device from the controller unit and data logging and storing the data on the smart device, generating via the controller unit a fit factor parameter corresponding to a quantitative effectiveness of the mask fitting a user.

24. The method of claim 19 wherein the wearable respirator fit monitor comprises the first and second particle counters and the controller unit and is wearable by a user.

25. The method of claim 24 wherein the wearable respirator fit monitor additionally comprises a power source for powering the controller unit and the first and second particle counters.

26. The method of claim 24 further comprising:
providing a wearable mask for a user configured to provide the first aerosol sample to the inlet of the first particle counter of the wearable respirator fit monitor;
generating via the controller unit a fit factor parameter corresponding to a quantitative effectiveness of the mask fitting a user; and
displaying to the user the fit factor parameter or an indicator of the effectiveness of fit.

27. The method of claim 24 further comprising:
providing a wearable mask for a user configured to provide the first aerosol sample to the inlet of the first particle counter of the wearable respirator fit monitor;
generating via the controller unit a real time fit factor parameter corresponding to a quantitative effectiveness of the mask fitting a user; and
continuously displaying to the user the real time fit factor parameter or an indicator of the real time effectiveness of fit.

28. A method of fit testing a wearable respirator monitor comprising the steps of:
measuring particle concentration in an aerosol sample using a particle counter, the particle counter having an inlet for receiving an aerosol sample, wherein the particle counter is one of an optical sensor, a condensation particle counter (CPC) device and a particle mass sensing detector;
receiving at a controller unit a first and second input signals corresponding to particle concentrations in each of a first and second aerosol samples received from each of the particle counters, wherein the controller unit continuously generates a real time particle concentration parameter corresponding to a ratio of the first and second input signals received from the particle counter;
providing a switching valve device coupled to the particle counter and adapted to facilitate sampling a first aerosol sample and a second aerosol sample using the particle counter, wherein the controller unit actuates the switching valve to generate the first and second input signals from the particle counter; and
powering the controller unit and the particle counter.

29. The method of claim 28 further comprising the step of exhausting with an auxiliary pump the particle counter to facilitate a continuous airflow through the particle counter.

30. The method of claim 28 further comprising the step of generating with the controller unit a protection factor parameter corresponding to a quantitative effectiveness of a mask fitting a user.

31. The method of claim 28 further comprising the steps of:
- providing a wearable mask for a user configured to provide the first aerosol sample to an inlet of the particle sensor; and
- displaying data on a smart device from the controller unit and data logging and storing the data on the smart device, generating via the controller unit a fit factor parameter corresponding to a quantitative effectiveness of the mask fitting a user.

32. The method of claim 28 further comprising the step of continuously displaying a real time fit factor or an indicator of the real time effectiveness of fit.

\* \* \* \* \*